(12) United States Patent
Lenihan

(10) Patent No.: US 12,104,741 B2
(45) Date of Patent: Oct. 1, 2024

(54) REVERSIBLE L-BRACKET

(71) Applicant: 3 LEGGED THING LIMITED, Bedfordshire (GB)

(72) Inventor: Danny Lenihan, Bedfordshire (GB)

(73) Assignee: Legged Thing Limited, Bedfordshire (GB)

( * ) Notice: Subject to any disclaimer, the term of this patent is extended or adjusted under 35 U.S.C. 154(b) by 0 days.

(21) Appl. No.: 17/854,353

(22) Filed: Jun. 30, 2022

(65) Prior Publication Data

US 2022/0333730 A1 Oct. 20, 2022

Related U.S. Application Data

(63) Continuation-in-part of application No. 17/278,401, filed as application No. PCT/GB2019/052677 on Sep. 24, 2019, now Pat. No. 11,408,558.

(30) Foreign Application Priority Data

Sep. 25, 2018 (GB) ...................... 1815612

(51) Int. Cl.
*F16M 11/04* (2006.01)
*F16M 13/02* (2006.01)
*G03B 17/56* (2021.01)

(52) U.S. Cl.
CPC ........ *F16M 11/041* (2013.01); *F16M 13/022* (2013.01); *G03B 17/561* (2013.01)

(58) Field of Classification Search
None
See application file for complete search history.

(56) References Cited

U.S. PATENT DOCUMENTS 4,081,814 A    3/1978  Bulland
4,319,825 A *  3/1982  Newton ............... G03B 17/561
                                                     396/428

(Continued)

FOREIGN PATENT DOCUMENTS

CN    204268003    4/2015
CN    206237490    6/2017

(Continued)

OTHER PUBLICATIONS

Search Report dated Mar. 18, 2019 issued in corresponding GB Appln. No. 1815612.5.

(Continued)

*Primary Examiner* — Monica E Millner
(74) *Attorney, Agent, or Firm* — Andrus Intellectual Property Law, LLP

(57) ABSTRACT

There is provided a mounting assembly comprising: a base against which the photographic device is placeable in use, the base comprising an engagement structure arranged in use to provide engagement of the base with the support; a connector engaged with the base in use and arranged in use to removably connect to the photographic device; and an extension plate securable to the base in a plurality of positions and removably securable to a side element, an amount of overlap of the extension plate and base being determined by the position in which the extension plate is secured to the base, the position of the side element relative to the base thereby being movable.

26 Claims, 15 Drawing Sheets

(56) References Cited

U.S. PATENT DOCUMENTS

| | | | | |
|---|---|---|---|---|
| 4,727,390 | A | * | 2/1988 | Brown ............... F16M 11/2092 |
| | | | | 396/428 |
| 6,027,085 | A | * | 2/2000 | Ruther ................. F16M 11/041 |
| | | | | 248/187.1 |
| 7,883,279 | B2 | * | 2/2011 | Kendall ................. G03B 17/00 |
| | | | | 396/428 |
| 8,662,763 | B2 | | 3/2014 | Vogt |
| 8,827,574 | B2 | * | 9/2014 | Johnson .................. H01G 9/15 |
| | | | | 396/419 |
| 9,052,574 | B1 | | 6/2015 | Johnson, Sr. |
| 9,280,039 | B2 | | 3/2016 | Johnson, Sr. et al. |
| 9,298,069 | B2 | | 3/2016 | Johnson, Sr. |
| 9,372,383 | B2 | | 6/2016 | Johnson, Sr. |
| 10,437,138 | B1 | | 10/2019 | Fudala |
| 11,092,882 | B2 | * | 8/2021 | Fliger ................... F16M 11/04 |
| 11,347,137 | B2 | * | 5/2022 | Johnson, Sr. ........ F16M 11/242 |
| 11,408,558 | B2 | * | 8/2022 | Lenihan ............... G03B 17/561 |
| 2010/0158499 | A1 | | 6/2010 | Kendall |
| 2011/0129210 | A1 | * | 6/2011 | McGucken .......... G03B 17/561 |
| | | | | 705/26.5 |
| 2015/0286116 | A1 | | 10/2015 | Johnson, Sr. et al. |
| 2022/0146914 | A1 | | 5/2022 | Johnson, Sr. et al. |
| 2022/0269151 | A1 | * | 8/2022 | Chan .................... G03B 17/561 |

FOREIGN PATENT DOCUMENTS

| | | |
|---|---|---|
| CN | 207539555 | 6/2018 |
| JP | H03130744 | 10/1989 |
| KR | 20180001550 | 5/2018 |

OTHER PUBLICATIONS

International Search Report and Written Opinion in corresponding PCT/GB2019/052677, dated Apr. 2, 2020.

Search Report dated Nov. 12, 2021 issued in corresponding GB Appln. No. 1815612.5.

First Office Action for Chinese Patent Application No. 2019102845433, issued Mar. 9, 2022.

* cited by examiner

REVERSIBLE L-BRACKET

CROSS-REFERENCE TO RELATED APPLICATIONS

This application is a continuation-in-part of U.S. patent application Ser. No. 17/278,401, filed Mar. 22, 2021, which is the U.S. national stage application of International Application No. PCT/GB2019/052677, filed Sep. 24, 2019, which international application was published on Apr. 2, 2020, as International Publication No. WO/2020/065289 in the English language. The International Application claims priority of United Kingdom Patent Application No. 1815612.5, filed Sep. 25, 2018.

BACKGROUND

The present invention relates to a mounting assembly for mounting a device to a support.

Photographers and cinematographers commonly mount cameras and other photographic and cinematic devices on supports such as tripods and monopods. While such supports are typically provided with a swivel or joint element to allow the device to be configured between different orientations, such as landscape or portrait, moving between the orientations can be cumbersome and can often shift the centre of gravity of the device resulting in a loss of stability.

L-brackets, which allow an easy and controlled configuration of a photographic device between different orientations on the support, have become increasingly popular with consumers. They also retain the camera sensor position, which in turn retains the focal plane, which is the signature attribute of an L-Bracket. An L-bracket is a mounting assembly which consists of a base portion and an arm portion positioned at a right angle to the base portion to provide the "L" shape that gives the bracket its name. Each of the base portion and the arm portion typically has a means for connecting to a support, which typically includes a quick-release engagement means which is able to co-operate with a complementary engagement element on the support for easy attachment and detachment. The camera, or other photographic device, is securely mounted on the base portion of the L-bracket such that the arm portion extends parallel to a side of the device. Usually, a face of the arm portion also abuts the side of the device. The L-bracket can then be mounted on the support via either one of the base or arm portions. Using the quick-release engagement of the L-bracket, a user can easily switch between a first configuration in which the device is secured on the support at a first (e.g. landscape) orientation, and a second configuration in which the device is secured on the support at a second (e.g. portrait) orientation.

Due to the way in which an L-bracket cradles a device, in use, some portions of the mounted device can be obscured by various parts of the L-bracket. For example, the arm portion of the L-bracket can often obscure connection ports on the side of a mounted camera. Additionally, the base can obstruct the battery door or may impede the use of a flip-up or openable screen. While L-brackets can be designed to try and avoid blocking specific features on cameras, most cameras are significantly different in design. As such, L-brackets typically have to be designed specifically for each device, which results in a high cost and low availability for consumers. Furthermore, consumers who use more than one device typically have to carry around multiple L-brackets.

There is therefore a need for a mounting assembly with the capability to provide the above functionality, but which can be adapted for different devices.

The present invention seeks to address at least some of the above problems.

SUMMARY OF THE INVENTION

According to a first aspect there is provided a mounting assembly for mounting a device to a support, the assembly comprising a base plate comprising a connector to removably connect, in use, the base plate to the device, and an engagement means for engagement with the support; and an arm being a plate having a C-shape provided by an aperture in the plate, the arm thereby having an opening in a side, the arm having a plurality of attachment elements arranged, in use, to attach the arm to the base plate, wherein the position of the opening causing the opening to have a different position relative to the base plate when the arm is connected to the base plate by each respective attachment element.

By having an opening and a plurality of attachment elements arranged to attach the arm to the base plate, it is possible to provide a mounting assembly having an opening in the arm portion in which the position of the opening with respect to the base plate can be easily varied. The opening in the arm portion provides, in use, access to the device even when the device is fully mounted on the mounting assembly. By changing the position at which the arm is connected to the base plate, the user can easily configure the mounting assembly to suit the dimensions of the device to which it is applied. The first aspect thereby provides a versatile mounting assembly which can be adjusted for use with many different devices, while providing the functionality of a stable and reliable mounting to a support.

The base plate and arm may be orientated at a right angle relative to each other. Such a configuration allows the mounting assembly to function as an L-bracket, while providing the versatility of being adjustable for the device to which the mounting assembly is applied.

Whilst the arm may have attachment elements arranged in any position, typically the arm may have opposing ends, the opening being between the opposing ends, and each end may have at least one attachment element.

The distance between attachment elements at the ends of the arm and the relative location of the opening in relation to the ends allows a greater variation in the location at which the arm can be attached to the base plate. By allowing a greater variation in the connection between the arm and the base plate, it is possible to provide a wide range of positions to which the opening in the arm can be configured. The positioning of attachment elements at the ends of the arm also allows the attachment elements not to interfere with the main body of the arm, such that the aperture can be made as large as possible to provide increased access to the device in use.

Typically, the arm may have a front face and a rear face (in addition to the arm having sides for example). Additionally each face may have at least one attachment element. By each face of the arm having an attachment element, the versatility is improved by providing a greater number of positions in which the opening of the arm is able to be placed. Further the attachment elements may be in corresponding positions on each face. This makes it possible to ensure that the load experienced due to attachment with the base plate is consistent. Furthermore, if the attachment elements at similar or corresponding positions on each face, as is an option, significantly simplifies manufacture of the arm.

Each attachment element may comprise one or more bores. Furthermore, each of the bores may be arranged, in use, to engage a first securing element engageable with the base plate. Mounting equipment such as the mounting assembly of the first aspect is often used to mount delicate and often very expensive, devices to a support. It is important therefore that any connection between parts is rigid and stable. By having bores arranged to accept and engage a securing element, it is possible to ensure a tight connection between the arm and the base plate.

The first securing element may comprise a rail. At least a portion of the rail may have a threaded surface. To co-operate with the threaded surface of the rail, the bores may be threaded bores or have a threaded portion. A threaded connection, such as that provided by a screw, ensures tight and durable attachment of the first securing element to the attachment means.

Each of the bores may be through-bores. When the first securing element is longer than the bore, this allows the length of a projecting part of the first securing element to be adjusted and further allows the first securing element to be accessed and adjusted from either side of the connection. Of course, it would be possible for each bore to be a blind-bore or for there to be a combination of through-bores and blind-bores.

Each of the through-bores may be distinct and spaced apart from each other. However, to provide additional functionality, typically the through-bores of each attachment means may be joined by one or more slots extending between the through-bores. For example, the slots may be used to clip or attach additional components to the mounting assembly. In some examples, the slots may themselves be through-slots, extending between the front and rear faces of the arm. In such a case, the through-slots can provide a further functionality as a loop for a camera strap, for example. Another advantage of slots between the bores is that this reduces the weight of the mounting assembly.

The connector on the base plate may comprise any element suitable to accept and removably engage a device. Typically, the connector may comprise a connector bore, and the connector bore may be arranged, in use, to engage a second securing element. A connector bore can provide a secure and stable connection between the device and the base plate, allowing for co-operation with a second securing element. The use of a connector bore as a connector is also advantageous in that it allows a device with an in-built connector, for example, a clip or a push-fit element to be connected to the base plate. As with the bores of the attachment means, the connector bore may be a through-bore, and may be at least partially threaded. The second securing element may be a rail or a bolt, and at least a portion of the second securing element may be threaded. To provide further flexibility, the attachment means of the arm may also be arranged to engage, in use, with the second securing element.

The base plate may comprise one or more bores arranged, in use, to engage with a first securing element to secure the base plate to the attachment means of the arm. By having bores arranged to engage with the first securing element, it is possible to reliably secure the arm to the base plate through the first securing element. In addition to, as an alternative to, the bores, the base plate may further comprise grooves or recesses arranged to receive and/or guide the first securing element. The grooves or recesses may be separate from, or continuous with, the bores of the base plate.

The first securing element may be slideable relative to the base plate. A sliding arrangement allows the connection between the arm and the base plate to be easily and precisely adjusted. For example, such an arrangement allows a user to easily adjust the mounting assembly to suit the dimensions of different devices.

The first securing element may be held in position in the bores of the base plate by a locking member.

In order to ensure a sturdy connection between the base plate and the arm, the first securing element typically is held in position in the bores of the base plate. The base plate may further comprise a locking member to lock the first securing element in position. The base plate may comprise one or more locking members, each arranged to lock one or more first securing elements in position. In the case that the first securing element is slideable relative to the base plate, once the user has adjusted and selected a configuration of the first securing element, the user may lock the base plate and arm in position by using the one or locking members.

It is important that the locking member is able to engage and maintain a secure hold of the first securing elements. Typically, the locking member may comprise one or more locking screws each arranged to engage one or more first securing elements. Alternatively, the locking member may comprise a clamp or a jaw arranged to grip the one or more first securing elements.

An important feature of the mounting assembly is the ability to mount the device to the support at two or more different orientations. To achieve this, the mounting assembly may be mounted to the support at either the base plate or the arm. The arm may comprise an engagement means for engagement with the support to achieve this.

The engagement means (ether on the arm or on the base plate) may be arranged to co-operate with a corresponding member on the support. For example, the engagement means may comprise one or more grooves arranged to cooperate with a jaw on the support. The engagement on one or both of the arm and the base plate may comprise a pair of grooves on opposing sides of the arm and base plate respectively. In a case where the mounting assembly is secured and gripped by a clamp or a jaw on the support, having a pair of grooves on opposing sides allows a strong and even application of force from the clamp or jaw. The grooves may be separate and attached to one or both of the base plate and the arm. Alternatively, the grooves may be integrally formed with one or both of the base plate and the arm.

The grooves of the engagement means may be dovetail grooves, meaning that at least a portion of the groove's cross section has a trapezoidal or triangular shape, and the groove is arranged to cooperate with a rail or jaw having a complementary shape to form a 'dovetail joint'. Dovetail joints provide a secure engagement, and have a high resistance to being pulled apart. This ensures improved stability. Furthermore, such an arrangement allows the engagement means of the base plate or arm to be easily slid in to a complementary member on the support, improving ergonomics. A further advantage of the use of dovetail grooves is that many support products use dovetail jaws to provide what is known as a 'Quick-Release (QR)' mechanism to facilitate rapid attachment and detachment of devices to the support. By using dovetail grooves, the mounting assembly provides compatibility with many supports, further improving versatility of the mounting assembly. For example, the engagement means may take the form of an Arca-Swiss style connection that is arrange in use to connect with a clamp or support with an Arca-Swiss style jaw arrangement.

The base plate may typically comprise an upper surface and a lower surface, the upper surface being arranged to receive, in use, the device to be mounted on the mounting assembly.

Many photographic devices have parts which have the ability to extend out of its main volume. For example, some modern cameras are provided with a 'flip' screen. Such a screen typically has the capability of being flipped and pulled to extend out of the camera. To accommodate for, and provide access to, parts of the device extending outward, at least one edge of the upper surface of the base plate may comprise a downward chamfer.

As it will be appreciated, many of the parts of the mounting assembly described above may be modular and removeable.

According to another aspect, there is provided a kit of parts for a mounting assembly according to any preceding claim, the kit comprising: a base plate comprising a connector to removably connect, in use, the base plate to a device, and an engagement means for engagement with a support; and an arm being a plate having a C-shape provided by an aperture in the plate, the arm thereby having an opening in a side, the arm having a plurality of attachment elements arranged, in use, to attach the arm to the base plate, wherein the position of the opening causes the opening to have a different position relative to the base plate when the arm is connected to the base plate by each respective attachment element.

According to another aspect there is provided a mounting assembly for (i.e. suitable for) mounting a photographic device to a support, the mounting assembly comprising: a base against which the photographic device is placeable in use, the base comprising an engagement structure arranged in use to provide engagement of the base with the support; a connector engaged with the base in use and arranged in use to removably connect to the photographic device; and an extension plate (or compatible accessory) securable to the base in a plurality of positions and removably securable to a side element, an amount of overlap of the extension plate and base being determined by the position in which the extension plate is secured to the base, the position of the side element relative to the base thereby being movable.

The inclusion of an extension plate reduces the torque, or twisting force, on a side element or on the base when assembling and using the mounting assembly. Additionally, the extension plate is easy to align with the other component, minimising the likelihood of breaking or bending the mounting assembly when assembling and in use. Additionally, the extension plate may be attachable to a side element to maximise the usefulness of the base assembly. The side element may be one or more of a variety of accessories or structural components including an arm, a handle or a cage. Further, the mounting assembly is suitable for use with various cameras and can be disassembled and easily stacked. This increases the photographer's ability to pack away the assembly in a bag or holdall for transportation with a reduced risk of damage to the components. Similarly, this allows a reduction in packaging used when packaged for sale or shipping. This is because the mounting assembly is able to be provide in a flat, unassembled, configuration instead of in a typically bulkier or less space efficient constructed configuration. A minimised number of small components also reduces the risk of misplacing a component in transit.

The extension plate may have a longitudinal axis and the base may have a longitudinal axis which may be aligned with each other, and the extension plate may be positioned in a plane parallel to the plane of the base (due to the base typically being, generally, flat, and itself forming a plate). This allows the user to vary the position of the side element relative to the base along the longitudinal axis of the base making the mounting assembly compatible with various cameras of different widths. This also maximises the area of the mounting assembly in contact with the photographic device base thereby further minimising rotation of the device.

Alternatively, the extension plate may have a longitudinal axis and the base may have a longitudinal axis which may be offset with each other. This makes the mounting assembly compatible with cameras of various shapes, particularly those having a slanted camera base, a non-uniform camera base or cameras that require a means of support other than a flat base.

The base may comprise a first recess (the first recess being) shaped to receive the extension plate. In other words, at least a portion of the extension plate may fit within the first recess. To enhance how sturdy the connection between the base and extension plate is, at least a portion of the extension plate may be held in position by the recess.

Additionally, the first recess may be a bore. This may provide support and sturdiness to at least a portion of the extension plate when in any one of the plurality of position. This is due to the support being provided around the extension plate, such as around a circumference or perimeter or a section of the at least a portion of the extension plate. Typically, the bore may be a blind bore. This may provide a stop for the extension plate and reduce the likelihood of material impinging on an end of the extension plate that could misalign or push the extension plate out of position relative to the base.

The mounting assembly may further comprise a second extension plate (which may be securable to the base in a plurality of positions and may be removably securable to a side element, an amount of overlap of the extension plate and base may be determined by the position in which the extension plate is secured to the base, the position of the side element relative to the base may thereby be movable). Providing multiple extension plates provides the base of the assembly with additional length to which it may extend, making the mounting assembly particularly compatible with larger camera models.

The extension plate may be securable at a first end of the base and the second extension plate may be securable at a second end of the base. Typically, the first end opposes the second end of the base (i.e. the second end is an opposing end to the first end). In other words, the extension plate may be located at a first end of the base and the second extension plate may be located at a second end of the base. The extension plate and/or the second extension plate may (each) have a longitudinal axis and the base may have a longitudinal axis which may be aligned with each other such that the base of the mounting assembly is extendable in both directions along the longitudinal axis of the base. As such, the versatility of the mounting assembly is thereby increase as it can accommodate larger cameras.

The mounting assembly may further comprise a plurality (such as two, three, four or more) of extension plates. The base of the assembly can therefore be extended in a plurality of directions, improving its versatility. Each extension plate may be securable to the base in a plurality of positions and may be removably securable to a side element, an amount of overlap of the extension plate and base may be determined by the position in which the extension plate is secured to the base, the position of the side element relative to the base may thereby be movable. Further, each extension plate may have a longitudinal axis aligned with a longitudinal axis of the base.

Any features discussed throughout the specification in relation to the extension plate are applicable to the second extension plate and to each of the plurality of extension plates. The extension plate may be slidable relative to the base. A sliding arrangement allows the connection between the arm and the base to be easily and more precisely adjusted. For example, such an arrangement allows a user to easily adjust the mounting assembly to suit the dimensions of a given device.

The extension plate may be slidable along an axis parallel to the plane of the base. The axis parallel to the plane of the base may be the same as the longitudinal axis of the base.

The extension plate may further comprise one or more guides arranged in use to direct sliding of the extension plate relative to the base. This allows for smooth, slidable movement of the extension plate and typically limits movement to only the directions allowed by the one or more guides. This assists in maintaining suitable alignment between the extension plate and base.

Additionally, the base may further comprise one or more slots, and at least one of the one or more guides is located in each of the one or more slots. This means slideable movement is typically limited to the direction or directions defined by the slots. Each slot and the guide or guides located in the respective slot provide an arrangement that allows for simple alignment of the extension plate and base orientation. The guides may be permanently located in the slot or may be removable.

Further, the or each guide may be a screw. The screw used may be any type of suitable screw including, for example, a socket screw. Again, the screw may have any suitable head style for example a socket cap, a flat, an oval, a round or a hex head. Any head style may be used in combination with any drive type including a slotted, combination or square drive type. The above is relevant for any subsequently described screws of the mounting assembly. Use of a screw allows the guide to be a simple component that is easy to maintain and replace if needed.

The base may further comprise one or more locking members arranged (in use) to secure the extension plate when in any one of the plurality of positions. Once the user has adjusted and selected a configuration of the extension plate, the extension plate may be held in place by using the one or more locking members. This reduces undesired movement of the extension plate and provides the user with a simple mechanism to implement when deciding on the relative position of the extension plate and base.

When present, it is important that the one or more locking members are able to engage and maintain a secure hold of the extension plate. As such, additionally, the extension plate may further comprise a plurality of apertures each arranged such that, when the extension plate is in one of the plurality of positions, one or more of the plurality of apertures is able to receive (at least) one of the one or more locking members. The apertures may be holes in an upper or lower surface of the extension plate or may be through bores. The apertures may be shaped according to the shape of the received locking member, such that a close fit is established. Alternatively, the locking member may comprise a clamp or a jaw arranged to grip the extension plate and secure it in place.

Alternatively, the extension plate may comprise the one or more locking members arranged to secure the extension plate to the base when in any one of the plurality of positions. In this arrangement, the base may comprise the plurality of apertures, each arranged on the base such that when the extension plate is in one of the plurality of positions, one or more of the plurality of apertures is able to receive one of the one or more locking members.

The locking member may be a screw. When more than one screw is present in the mounting assembly, these may be the same screw type or may be different screw types.

The mounting assembly may further comprise a side element. This aids in the stabilising the device by redistributing the weight of the device and mounting assembly to maintain a centre of mass above the support. Additionally, the inclusion of the side element may provide extra functionality or connectivity to the mounting assembly.

The side element may comprise at least one second recess shaped to receive the plate. This helps provide a sturdy connection between the side element and extension plate by the side element holding the extension plate in position. Alternatively, the extension plate may comprise the second recess shaped to receive the side element, and instead, holds the side element in position. When more than one second recess is present on the side element, the side element may be positioned in different orientations relative to the base.

Additionally, the second recess may be a bore. This allows for a more secure connection by limiting relative movement more than could potentially be achieved with an open recess. The bore may typically be a through bore. This allows minimum extension of the extension plate when the side element is connected to the extension plate. Additionally, by the second recess being a through bore, it allows the extension plate to pass through the side element with an end at least be flush with a surface of the side element distal to the surface from which the extension plate passes into bore, restricting the ability for the side element to twist outward from the end of the extension plate. Further, should twisting occur, there will be even distribution of the side element impinging on the extension plate around the pivot point, which would not be the case if the bore was a blind bore.

The extension plate may be removably securable to the side element at an end of the plate. The side element being removable allows it to be removed from the mounting assembled and stored separately. This allows for safer storage of the side element, as opposed to a side element fixed to the assembly, possibly providing an 'L' shape, which likely will break upon transportation. Positioning the side element at the end of the extension plate maximises the distance between the side element and the base when the extension plate is secured at a maximum extension position, thereby providing a versatile mounting assembly which can be adjusted for use with many different devices.

The side element may comprise an attachment means arranged to provide engagement of the side element with the extension plate. The attachment means provides a sturdier connection between the extension plate and the side element. The attachment means may be positioned proximal to the second recess, when present, and arranged to aid with holding the extension plate in plate in the recess. Alternatively, the extension plate may comprise an attachment means arranged to provide engagement between the extension plate and the side element. There may be a plurality of attachment means arranged on the side element or extension plate causing the side element to have different orientations relative to the base by each respective attachment means.

The attachment means may be one or more screws.

The side element may be an arm, the mounting assembly thereby providing an L-bracket when the side element is secured to the extension plate. Preferably, the arm may be orientated at a right angle relative to the extension plate. Providing an L-bracket improves the stability of the device when mounted on the support by shifting the centre of mass of the device. Further, L-brackets allow an easy and controlled configuration of the device between different orientations on the support and may also retain the camera sensor and/or lens centre position, which in turn retains the focal plane, leading to an improved quality of photograph. Moving between base and side aspects should also retain the horizon relative to the camera or lens.

The arm may be a plate having a C-shape provided by an aperture in the plate, the arm thereby having an opening in a side. This allows a cable with a right-angle connector to be connected to a camera mounted on the L-bracket while the camera is mounted to the bracket.

Additionally, the arm may have a plurality of attachment means arranged to attach the arm to the extension plate, causing the opening to have a different orientation relative to the base plate when the arm is connected to the base by each respective attachment means. The opening in the arm portion provides, in use, access to the device even when the device is fully mounted on the mounting assembly.

The mounting assembly may further comprise a docking member removably securable to the base and having a shape arranged to provide engagement with the support. The docking member may be removed from the assembly when transporting, making it less likely to be damaged. Further, this reduces the need for multiple mounting assemblies to be carried for use with supports comprising different engagement means, thereby making mounting assembly more versatile and provides the ability for the docking member to be swapped or replaced. A removable docking means reduces damage, such a scratching, to the main body of the assembly that may occur from docking and undocking of the assembly with the support.

The docking member may be secured to the base by the connector. This minimises the parts required of the mounting assembly.

The shape of the docking member may comprise a foot with a surface shaped to engage with a support. Many supports, such as tripods or monopods, comprise a structure shaped to receive a foot, making the docking member compatible with multiple supports, providing a versatile mounting assembly.

The surface of the foot may be only a single surface or may be at least one surface, such as a plurality of surfaces, including two surfaces, three, four, five, six or more surfaces. Typically, the surface of the foot may be defined by at least two sides shaped to engage with the support. This allows for the user to select the orientation of with which the dock is able to be engaged and for that orientation to remain fixed once the mounting assembly is engaged with the support.

Alternatively, the docking member may be shaped to engagement with a clip or holster style product.

The base may further comprise a third recess arranged in use to receive at least a portion of the docking member. This provides a strong connection between the base and the docking member by the base holding the docking member in place. Further the third recess and docking member may have complementary shapes arranged in use to limit rotation of the docking member relative to the base.

Additionally, the third recess and the first recess may be non-overlapping. This allows each recess to have a shape tailored to hold their intended components i.e. the extension plate and the docking member. This also means the intended components will not contact each other when in their respective recesses, thereby reducing the risk of damage to either component.

According to a another aspect, there is provided a kit of parts for a mounting assembly suitable for mounting a photographic device to a support, the kit comprising: a base against which the photographic device is placeable in use, the base comprising an engagement structure arranged in use to provide engagement of the base with the support; a connector engagable with the base in use and arranged in use to removably connect to the photographic device; and an extension plate securable to the base in a plurality of positions and removably securable to a side element, an amount of overlap of the extension plate and base being determined by the position in which the extension plate is secured to the base, the position of the side element relative to the base thereby being movable.

BRIEF DESCRIPTION OF THE DRAWINGS

An example mounting assembly will now be described by way of example with reference to the accompanying drawings, in which.

DETAILED DESCRIPTION

Figure 1:
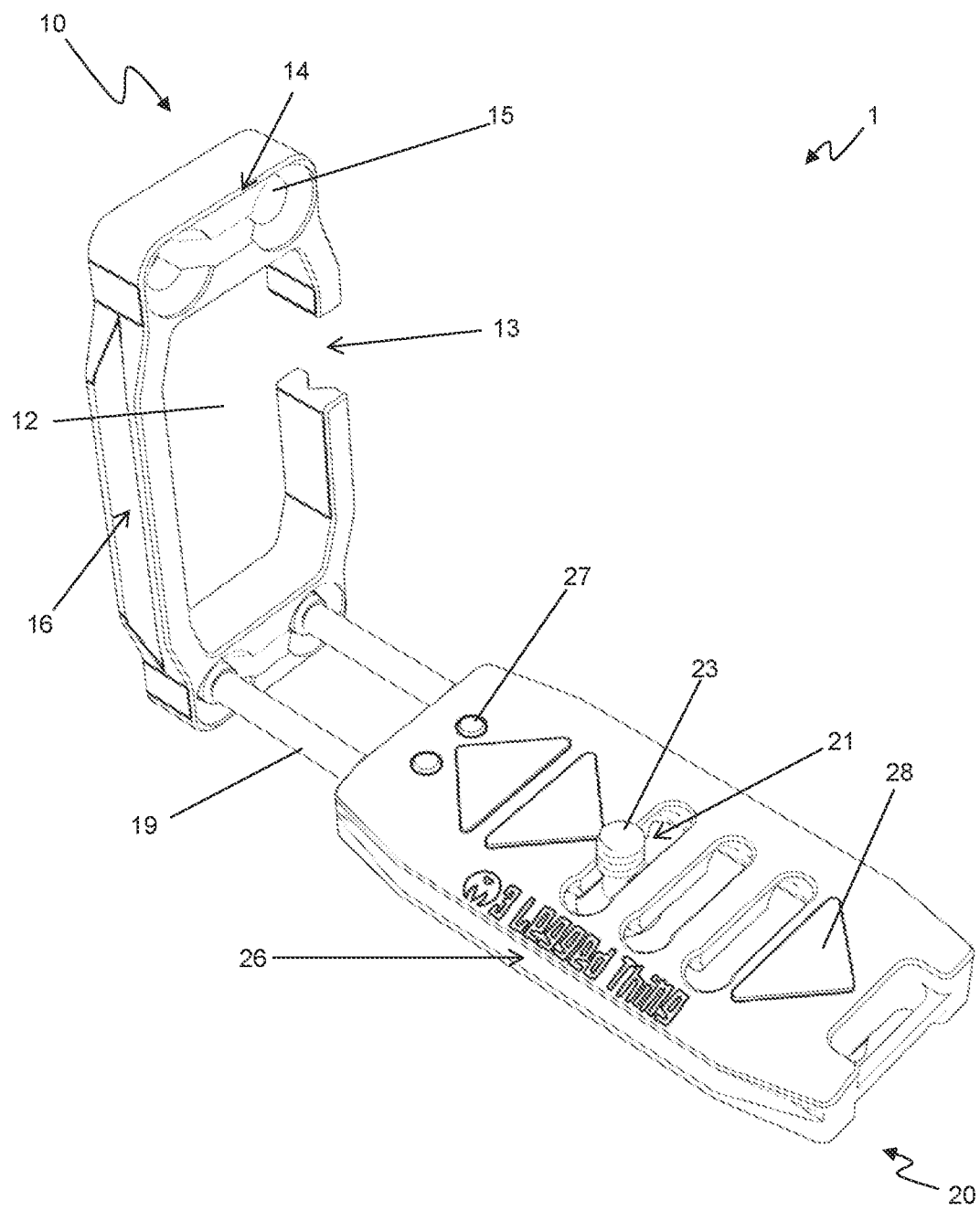
FIG. 1 schematically illustrates an example mounting assembly in an assembled configuration.

An example mounting assembly 1 is generally illustrated in an assembled configuration in FIG. 1. The mounting assembly 1 comprises an arm 10 and a base plate 20.

The mounting assembly 1 arranged to receive a device, such as a camera or other photographic or cinematic equipment, at either one of the arm 10 or the base plate 20.

The arm 10 comprises a plate 11 having an aperture 12 therethrough. The aperture 12 is provided on the arm 10 so as to form an opening 13 in a side, such that the arm 10 is substantially C-shaped. By C-shaped, we mean a shape having the shape of a capital letter 'C'. For example, such a shape takes the form of a quadrilateral having a break, or a gap, at one of its sides, as is shown in the configuration illustrated in FIG. 1. In other examples, a 'C-shape' may alternatively take the form of any other polygon or ellipse having a break or a gap on one of its sides.

In this example, the C-shaped arm 10 generally has two pairs of opposing sides: two opposing longitudinal sides, and two opposing lateral sides, the longitudinal sides being longer than the lateral sides. This forms a generally rectangular shape. The opening 13 is provided on one of the longitudinal sides, at a position closer to one of the two lateral sides than the other lateral side. In other examples, the opening 13 can be provided at a position which is equidistant from the pair of lateral sides. The opening 13 may also be provided at one of the lateral sides, rather than at a longitudinal side. In other examples, the lateral and longitudinal sides may have the same length thereby forming a generally square shape.

In addition to the two pairs of opposing sides, the arm 10 has two faces. These are separated by the sides of the arm, which provide the arm with its thickness.

Figure 2A:
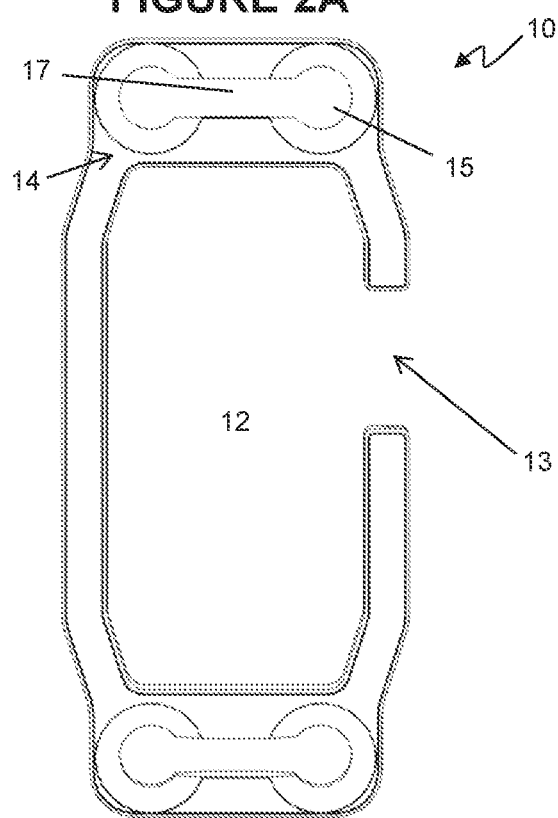
FIG. 2A schematically illustrates an example configuration of an arm of the mounting assembly of FIG. 1.
Figure 2B:
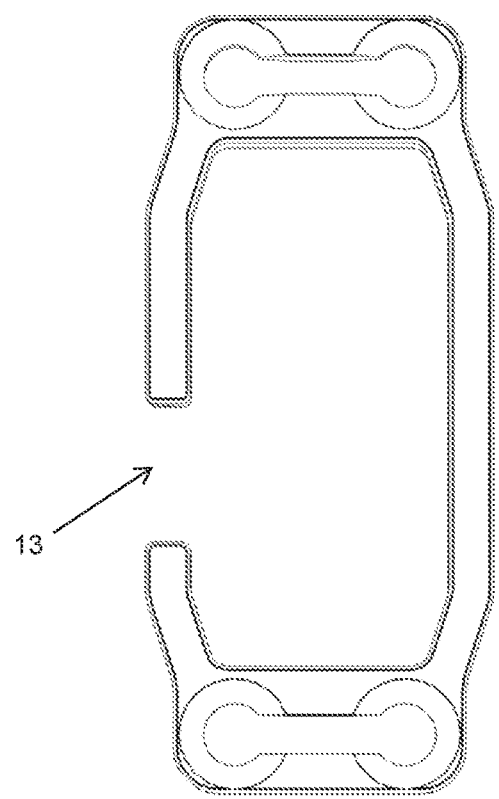
FIG. 2B schematically illustrates another example configuration of an arm of the mounting assembly of FIG. 1.
Figure 2C:
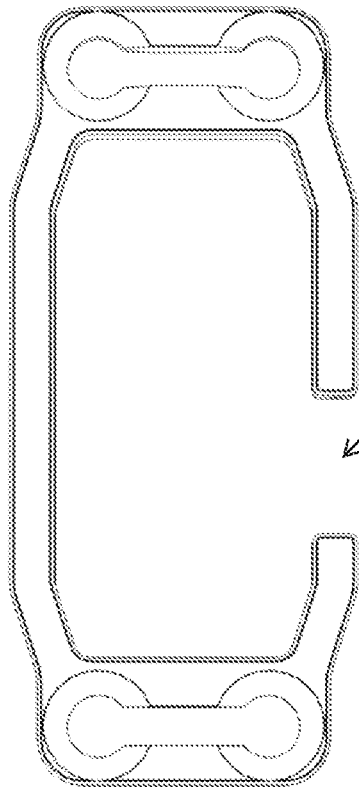
FIG. 2C schematically illustrates another example configuration of an arm of the mounting assembly of FIG. 1.
Figure 2D:
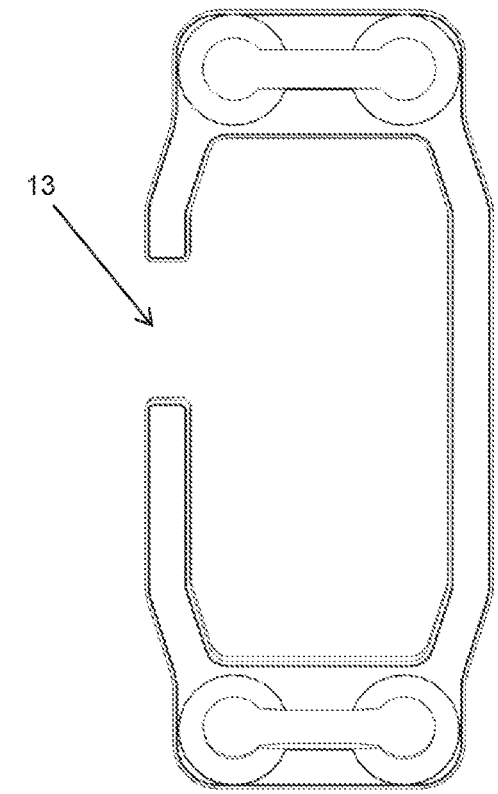
FIG. 2D schematically illustrates another example configuration of an arm of the mounting assembly of FIG. 1.

FIGS. 2A through 2D illustrate how the arm 10 can be configured to 'move' the position of the opening 13. FIG. 2A shows the arm 10 having the opening in a first position (in this example in an upper right quadrant of the arm). The arm 10 of FIG. 2A can be rotated through 180 degrees in the plane of the arm 10, as illustrated in FIG. 2B, to reposition the opening 13 apparently on an opposite longitudinal side to the arm 10 of FIG. 2A (so in this example in a lower left quadrant of the arm). Furthermore, the arm 10 of FIG. 2B can be rotated 180 about its longitudinal axis, to further reposition opening 13. Such a position is shown in FIG. 2C. This results in the opening being located in a lower right quadrant of the arm in this example. The rotated arm of FIG. 2C can then be rotated 180 degrees again in the plane of the arm to provide still another position for the opening 13. This is shown in FIG. 2D, which shows an example with the opening in an upper left quadrant of the arm. Due to the asymmetry of the arm 10, each one of the configurations shown in FIGS. 2A through 2D provides the opening 13 apparently at a different location when viewed straight on to one of the faces of the arm.

The arm 10 further comprises a plurality of attachment elements 14. In this example, two attachment elements 14 are provided on the arm 10, with each of the attachment elements 14 positioned at an opposing end of the arm 10. Whilst the example shows the attachment elements 14 near the lateral sides of the arm 10, in other examples the attachment elements 14 can be positioned near the longitudinal sides of the arm 10.

Each attachment element 14 is arranged, in use, to attach the arm 10 to the base plate 20. In this example, each attachment element 14 comprises two bores 15. The bores 15 are arranged to receive and engage a securing element 19 for securing the arm 10 directly or indirectly to the base plate 20. Examples of securing elements 19 include screws, rails, pins, or any combination of these. The bores 15 in the example shown are through-bores, and comprise a threaded surface. The threaded surface of each bore 15 is arranged, in use, to cooperate and engage with a complementary threaded surface on a securing element 19. Of course, depending on the choice of the securing element 19, other examples of the arm 10 may comprise blind bores or non-threaded bores. As well as having the threaded surface, the bores have a counter-sunk portion. As is set out in more detail below, this is configured to cooperate with a securing element. Each of the attachment elements 14 are symmetrically positioned on the arm 10.

The pair of bores 15 within each attachment element 14 are joined by a slot 17. Each slot 17 extends between the two bores 15 in each attachment element 14 to provide a continuous through-bore linking the two bores 15. The slots 17 can be used to provide additional functionalities, such as a hooking point for a strap or other accessories.

It will be noted that, as in the example shown, through-bores can act as attachment elements 14 on both faces of the arm 10. The bores 15 may be threaded from both a front and a rear face, to provide attachment elements 14 at corresponding positions on both faces. A securing element 19 may engage each of the through-bores 15 from either face of the arm 10.

The arm 10 further comprises an engagement means 16, arranged in use to cooperate and engage with a corresponding member of a support. By "support" we intend to mean tripod, monopod, ball head joint or any other means for attaching a bracket or mounting plate to a tripod or monopod. The engagement means 16 comprises a pair of grooves on the opposing longitudinal sides. In this example, the grooves are dovetail grooves. By dovetail, we intend to mean that at least a portion of the cross-section has a triangular shape. The grooves can be used to co-operate with a rail or jaw having a complementary shape, to form a 'dovetail joint'. In particular, the arm can be secured on a support by clamping the groove in a jaw member on the support. The support may comprise a 'Quick-Release (QR)' mechanism to facilitate rapid attachment and detachment of the engagement means to the support. The grooves in this example are intended to be compatible with an Arca-Swiss quick release system.

An important feature of the arm 10 is that the grooves of the engagement means 19 are symmetric about the longitudinal centre of the groove. In other words, the 'double-sided dovetail' grooves can cooperate with a jaw of a corresponding member on a support when the arm 10 has been rotated about its longitudinal axis. This allows the arm 10 to be attached to the base plate 20 in any one of the configurations shown in FIGS. 2A to 2D with either face being closer to the support than the other face.

Turning now to the base plate 20, an upper surface and a lower surface are provided on the base plate 20. In the example shown, the base plate 20 is arranged to receive a device on the upper surface.

The base plate 20 comprises a connector 21 for removeably connecting, in use, a device to the base plate 20. The connector 21 comprises a connector bore 22 and a securing element 23. The securing element 23 comprises a threaded bolt and is arranged to co-operate, through the connector bore 22, with a threaded surface on a device, to secure the base plate 20 and the device together. For reference, there are two standard thread sizes that are used for photographic equipment: a ⅜ inch (9.525 mm) thread, and a ¼ inch (6.350 mm) thread. The threaded bolt shown in FIG. 1 comprises a ¼ inch (6.350 mm) thread, to ensure universal connection with photographic equipment. In this example, the connector bores 22 are threaded at the same diameter as the bores 15 of the arm 10. This allows, for example, a device to be mounted at either one of the connector 21 of the base plate 20 or the attachment means 14 of the arm 10.

As shown in the figures, the base plate 20 may be provided with a plurality of connector bores 22. This provides the user with greater flexibility as to the position at which a device may be mounted to the base plate 20. For example, the connector bore 22 to be used may be chosen depending on the dimensions of the device being secured to the base plate 20.

As described above, the upper surface of base plate 20 is arranged to receive and secure a device to the base plate 20. In order to ensure a safe and durable interface between the device and the base plate 20, the upper surface of the base plate 20 is provided with gripping pads 28. In the example shown, a plurality of gripping pads 28 are provided and are distributed across a significant area of the upper surface. In other examples, a single pad 28 may be provided on the upper surface. The gripping pads reduce the likelihood of device slip, and also act as a cushion to provide a soft interface between the device and the base plate 20.

The base plate 20 further comprises an engagement means 26, arranged in use to co-operate and engage with a corresponding member of a support. As with the engagement means 16 on the arm, the engagement means 26 of the base plate 20 comprises a pair of dovetail grooves on opposing longitudinal sides. In this case, by dovetail, we intend to mean that at least a portion of the cross-section has a trapezoidal shape.

The grooves can be used to co-operate with a rail or jaw having a complementary shape, to form a 'dovetail joint'. In particular, the base plate 20 can be secured on a support by clamping the groove in a jaw member on the support. The support may comprise a QR mechanism to facilitate rapid attachment and detachment of the engagement means to the support. Again, this is intended to be compatible with an Arca-Swiss type quick release system.

Figure 3:
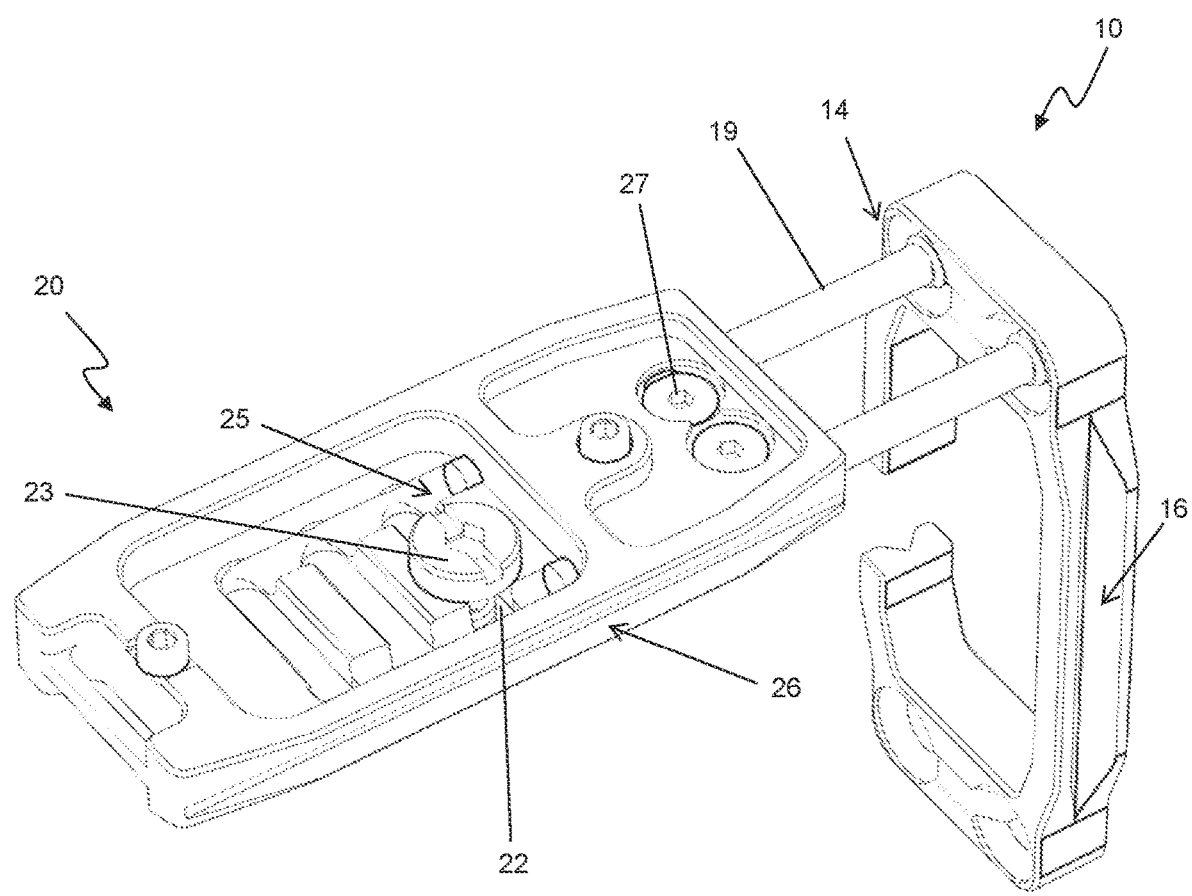
FIG. 3 schematically illustrates a detail view of a portion of the example mounting assembly of FIG. 1.

The mounting assembly of FIG. 1 shows the arm 10 and the base plate 20 being connected via a securing element 19. A detailed view of the connection is shown in FIG. 3.

In the example shown, which is viewed from below the assembly in FIG. 3, the base plate 20 comprises two bores 24 each arranged to engage with a securing element 19 to secure the base plate 20 to the attachment means 14 of the arm 10. The base plate 20 further comprises recesses 25 adjacent to the bores 24. The recesses are arranged to receive and guide the securing element 19, and to allow a smooth slideable engagement between the base plate 20 and the securing element 19.

In the assembled configuration, the arm 10 is secured to the base plate 20 by a securing element 19. The securing element 19 engages an attachment means 14 of an arm at one end and a bore 24 of the base plate 20 at the other end. A user can select a desired configuration of the arm 10 (from the configurations shown in FIGS. 2A to 2D), and connect the securing element 19 to the attachment means 14 of the arm 10. The securing element 19 can then be inserted in the bores 24 of the base plate 20 to complete the connection between arm 10 and base plate 20.

In this example the securing element 19 is provided by a rail, a pair of which are used to connect the arm and base plate as set out above. The rails have a cylindrical pole section engageable with the bores 24 of the base plate 20 and a treaded end portion engageable with the arm. The end portion of each rail also has a tapered portion that has a complimentary shape to the counter-sunk portion of the attachment elements 14 of the arm 10. This allows the end of the rail to be flush with a face of the arm when the arm is mounted to the base plate.

The base plate 20 shown in FIG. 3 further comprises two locking members 27. Each of the locking members 27 are arranged to lock the position of a securing element 19 in the bore 24 and recess 25 of the base plate 20. The locking members 27 comprise locking screws whose axis of insertion into the base plate 20 intersects the axis of motion of the securing element 19 in the bore 24. The locking screws can be tightened to exert a force on the securing element 19 so as to engage and hold the securing element 19 in position. In this way, once a desired orientation of the arm 10 and base plate 20 has been achieved, a user can lock the parts together and ensure that the mounting assembly 1 holds its configuration.

As can be seen in FIG. 3, the lower surface of the base plate 20 can comprise raised portions or areas of raised surface. The raised surface can be arranged to interact with a complementary portion of an external component.

Once assembled, the mounting assembly 1 can be used to mount a device to a support, by connecting a device to the connector 21 (or one of the attachment means 14) and then engaging the mounting assembly 1 to a support via one of the engagement means 16 or 26.

Due to the aperture 12 in the arm, the mounting assembly 1 provides a user with significant access to the device even when the device is in use on the assembly 1. Advantageously, the arm 10 can be configured, using one of the orientations shown in FIGS. 2A to 2D, to position the opening 13 to provide still further access to the device when in use. The ability to move the position of the opening 13 provides significant versatility to the mounting assembly 1, which can be adjusted and configured for use with a large number of devices. A particular advantage of the opening 13 is that it allows the user to connect to the side of the device cables having right-angled connectors.

Figure 4A:
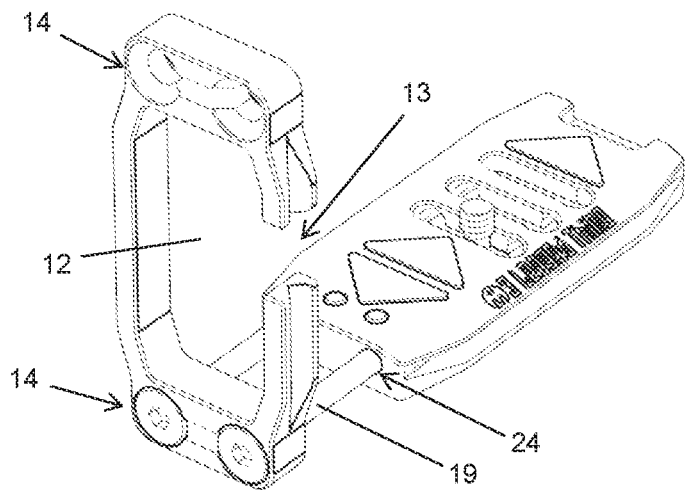
FIG. 4A schematically illustrates an example configuration of the mounting assembly of FIG. 1.
Figure 4B:
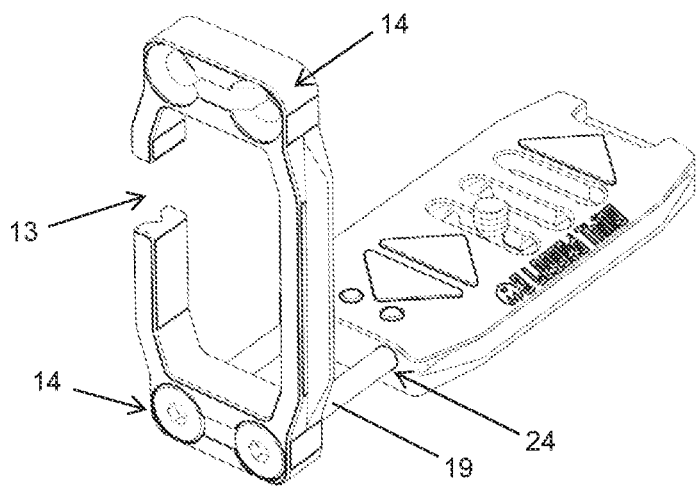
FIG. 4B schematically illustrates another example configuration of the mounting assembly of FIG. 1.
Figure 4C:
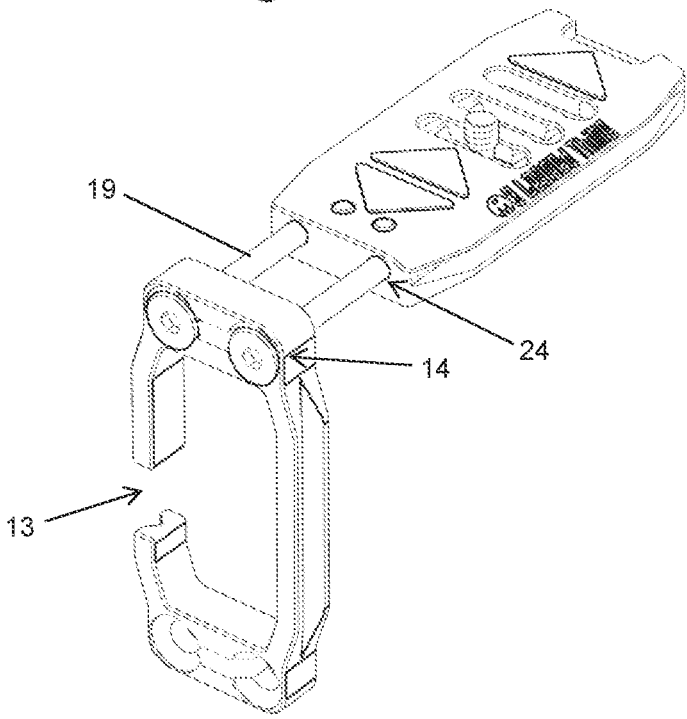
FIG. 4C schematically illustrates another example configuration of the mounting assembly of FIG. 1.

Some example configurations of the mounting assembly 1 have been illustrated in FIGS. 4A to 4C. FIGS. 4A and 4B illustrate example configurations of the mounting assembly 1 in which the orientation of the arm 10 has been rotated by 180 degrees about its longitudinal axis. A user may effect a transition between the two configurations of FIGS. 4A and 4B by disengaging the securing element 19 from the base plate 20 and the arm 10, rotating the arm 180 degrees through its longitudinal axis and reengaging the securing means to both the base plate 20 and the arm 10.

It can be seen that, by attaching the arm 10 to the base plate 20 at the different attachment elements, the apparent position of the opening 13 with respect to the base plate 20 can be reconfigured. In other words, the distance from the opening 13 to the base plate 20 is different when the arm 10 is connected to the base plate 20 by each respective attachment element 14.

FIG. 4C shows an alternative arrangement with the arm 10 extending downwardly from the base plate instead or upwardly as in FIGS. 4A and 4B. This is achieved by the manner in which the securing element 19 and arm are arranged relative to the base plate. This allows the arm to be used as a handle or as an alternative support means when the device mountable to the base plate is wanted in a different position.

In order to facilitate the use of device accessories such as a camera flip screen, the upper surface of the base plate 20 has a chamfered edge along a longitudinal side (i.e. the side on which the engagement elements are located). This provides an angled surface to allow a user to insert their figures between the base plate and the device to a sufficient extend to release the flip screen.

Figure 5:
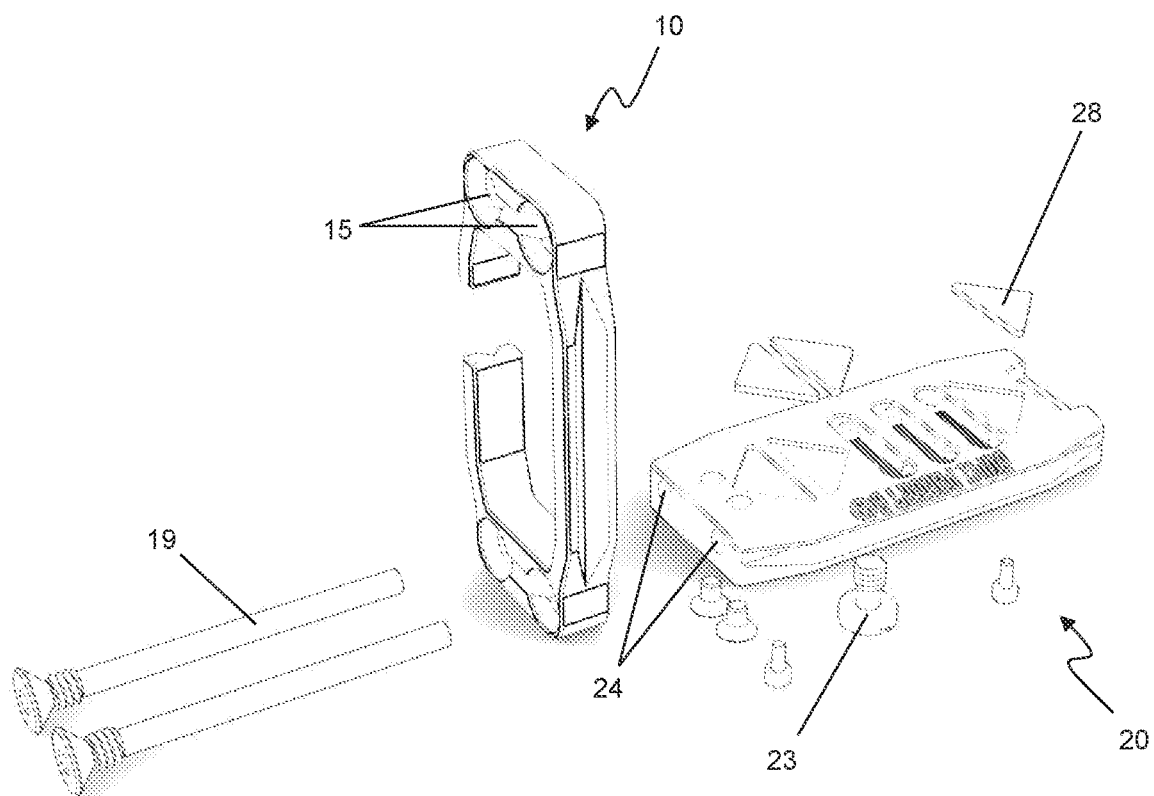
FIG. 5 schematically illustrates the example mounting assembly of FIG. 1 in an unassembled configuration.

The mounting assembly 1 can be seen in FIG. 5 in an unassembled configuration. It can be seen from FIG. 5 that the mounting assembly 1 can easily be assembled from a kit consisting mainly of the arm 10 and the base plate 20. It can also be seen that the orientation of the arm 10, and thus the positon of the opening 13, can easily be configured by removing the securing element 19, adjusting the arm 10 with respect to the base plate 20, and re-engaging the securing element 19.

Figure 6:
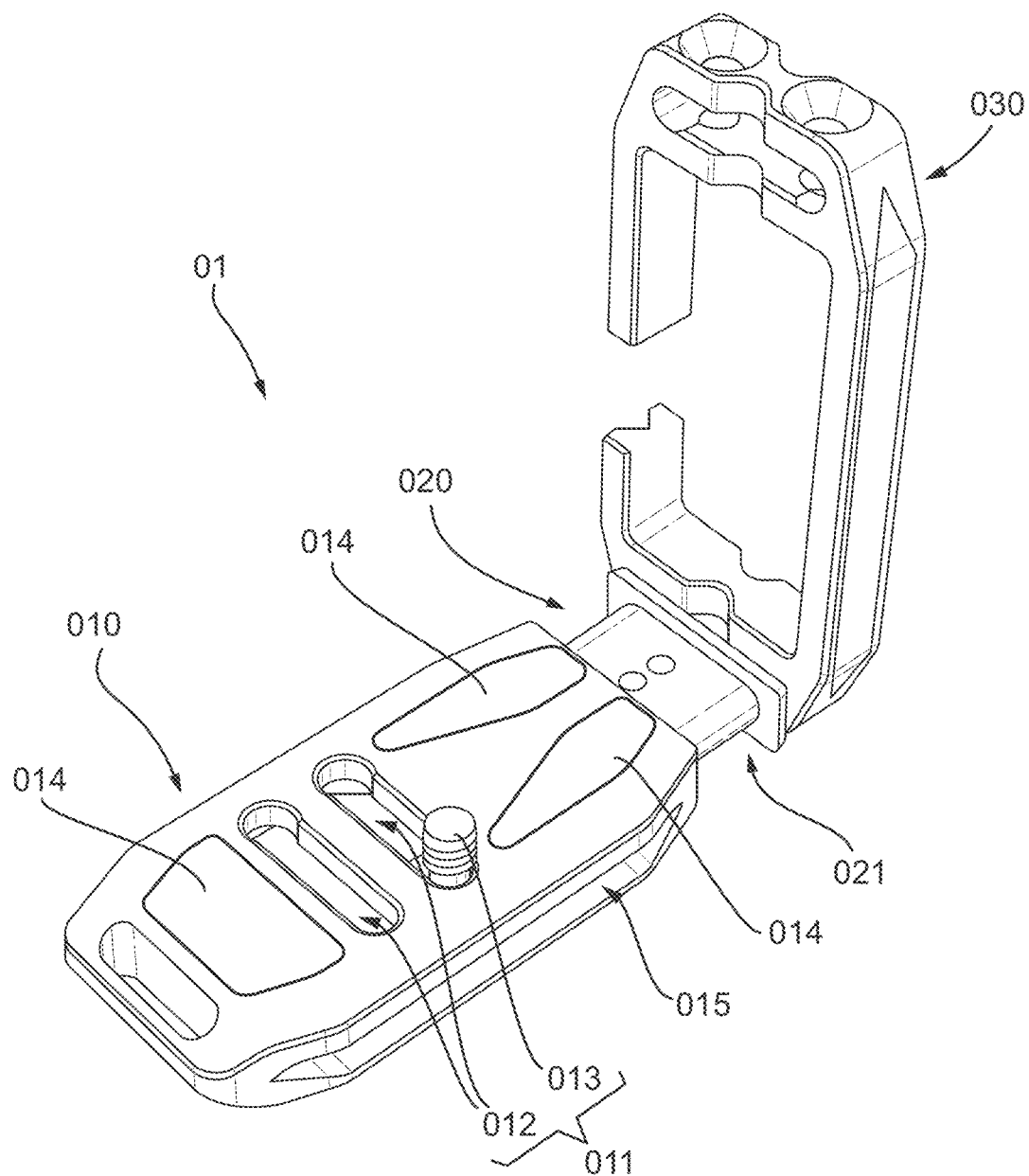
FIG. 6 schematically illustrates an example mounting assembly in an assembled configuration.

Another example mounting assembly 01 is generally illustrated in an assembled configuration in FIG. 6. The mounting assembly 01 comprising a base 010 and an extension plate 020. In the shown configuration, the extension plate 020 is secured to the base 010 in a partially extended position; however, the extension plate 020 can be securable to the base 010 in a plurality of positions. As shown, the extension plate 020 is secured to a side element 030 at an end of the plate 021, however, in other examples the side element 030 may be secured at a different location along the longitudinal axis of the plate 020, or may not be present at all.

Turning first to the base 010, an upper surface and a lower surface are provided on the base 010, separated by a pair of opposing sides and two ends, thereby forming a generally cuboidal shape. The base 010 is arranged to receive a device on the upper surface.

The base 010 comprises a connector 011 for removably connecting, in use, a device to the base 010. The connector 011 comprises a connector bore 012 and a securing element 013.

In the example assembly 01 shown in FIG. 6, the base 010 is provided with more than one connector bores 012. This equips the user with greater flexibility as to the position at which a device may be mounted to the base 010. For example, the connector bore 012 to be used may be chosen depending on the dimensions of the device being secured to the base 010.

In the example shown in FIG. 6, each connector bore 012 or the plurality of connector bores is provided by a slot in the base 010. The slot passes across the base, orientated with a longitudinal axis that intersects with the sides of the base. There is a separation between the slots with one slot being closer to one end of the base than the other. In other examples there may only be a single slot, or there may be three or more, instead of the two slots shown in the example of FIG. 6.

The securing element 013 can be a threaded bolt. This is typically a ¼ inch of ⅜ inch screw, which are a standard size for a camera mounting nuts that at provided to a ¼-20 UNC or ⅜-16 UNC standard. The securing element is, in use, arranged through the connector bore 012 to engage with a threaded surface on a device, allowing securing of the base 010 to the device.

Once threaded through the connector bore 012 into which it is fitted, the securing element 013 and connector bore are cooperatively shaped so as to allow the securing element to move along the length of the slot providing the connector bore. This allows any photographic device to which the securing element is threaded to be positioned as desired relative to the base 010 within the limits of the slot.

By having multiple connector bores 012, the securing element 013 can be arranged through any one slot. This allows the position of a photographic device to which the securing element 013 is threaded relative to the base 010 to be further adjusted. This is because multiple slots arranged next to each other provides different lateral positions to be chosen as well different forward and backward positions to be chosen (as is the case for the length of the slots). Additionally, this allows the position of the securing element to be chosen based on the position on a photographic device to which the securing element is threaded in use and desired location of that position relative to the base.

As described above, the upper surface of base 010 is arranged to receive and secure a device to the base 010. In order to ensure a safe and durable interface between the device and the base 010, the upper surface of the base 010 can be provided with gripping pads 014. In the example shown in FIG. 6, a plurality of gripping pads 014 are provided and are distributed across a significant area of the upper surface. In other examples, a single gripping pad 014 may be provided on the upper surface, or a plurality of gripping pads 014 of the same or various shapes and sizes may be provided on the upper surface of the base 010. The positioning and/or number of gripping pads 014 can be chosen based on the model and/or shape of the device. The gripping pads 014 reduce the likelihood of device slip by increasing the friction between the base 010 and the device while also acting as a cushion to provide a soft interface between the device and the base 010.

The base 010 further comprises an engagement structure 015 arranged, in use, to provide engagement of the base 010 with a support. Typically, the engagement structure 015 of the base 010 comprises a pair of dovetail grooves on opposing longitudinal sides, such as grooves that conform to the Arca-Swiss format. In this case, by dovetail, we intend to mean that at least a portion of the cross-section has a trapezoidal shape.

The grooves can be used to co-operate with a rail or jaw having a complementary shape, to form a dovetail joint. In particular, the base 010 can be secured on a support by clamping the groove in a jaw member on the support. The support may comprise a Quick-Release (QR) mechanism to facilitate rapid attachment and detachment of the engagement structure to the support. Again, this is intended to be compatible with an Arca-Swiss type quick release system.

Figure 7A:
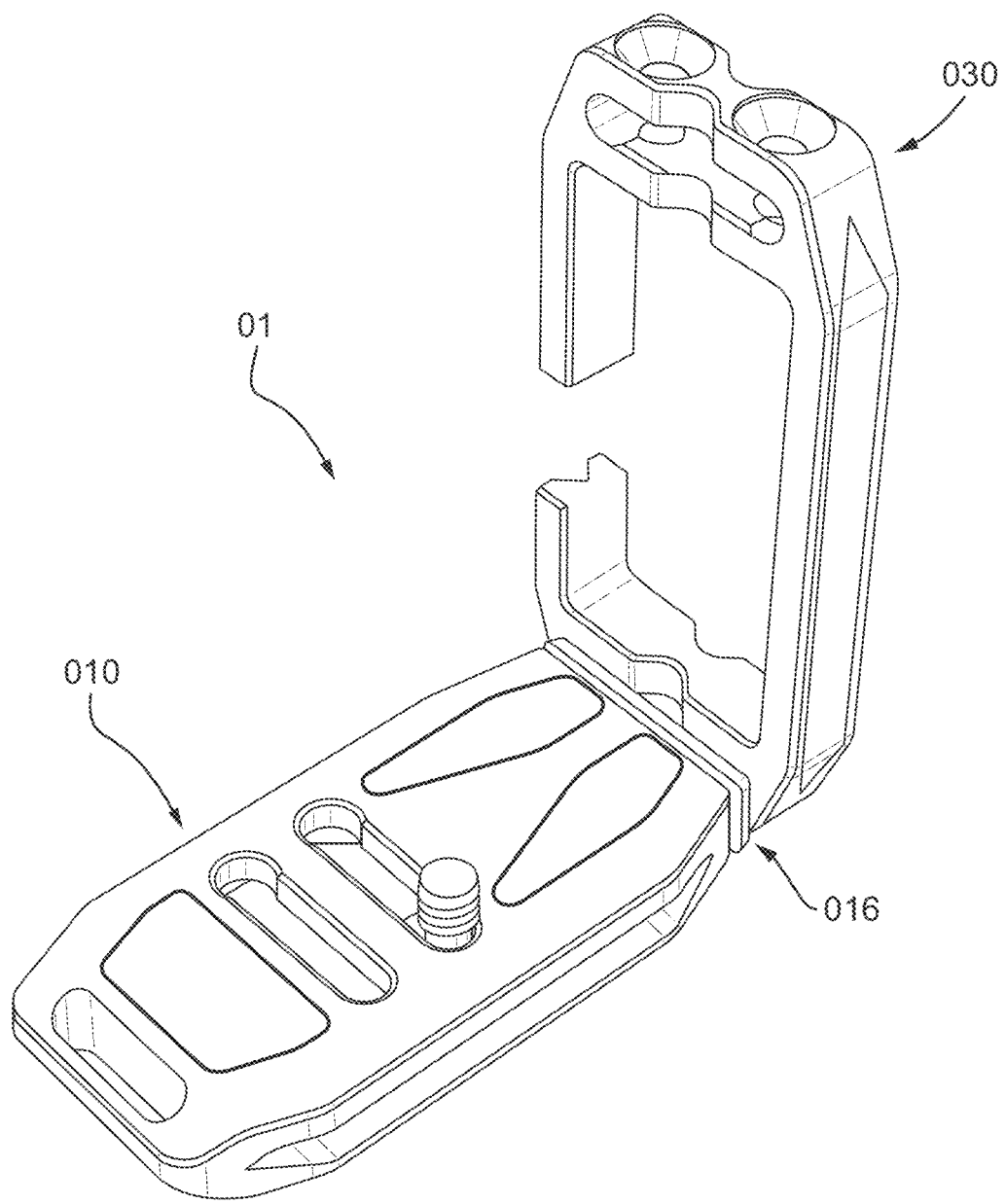
FIG. 7A schematically illustrates an example mounting assembly in a first configuration.
Figure 7B:
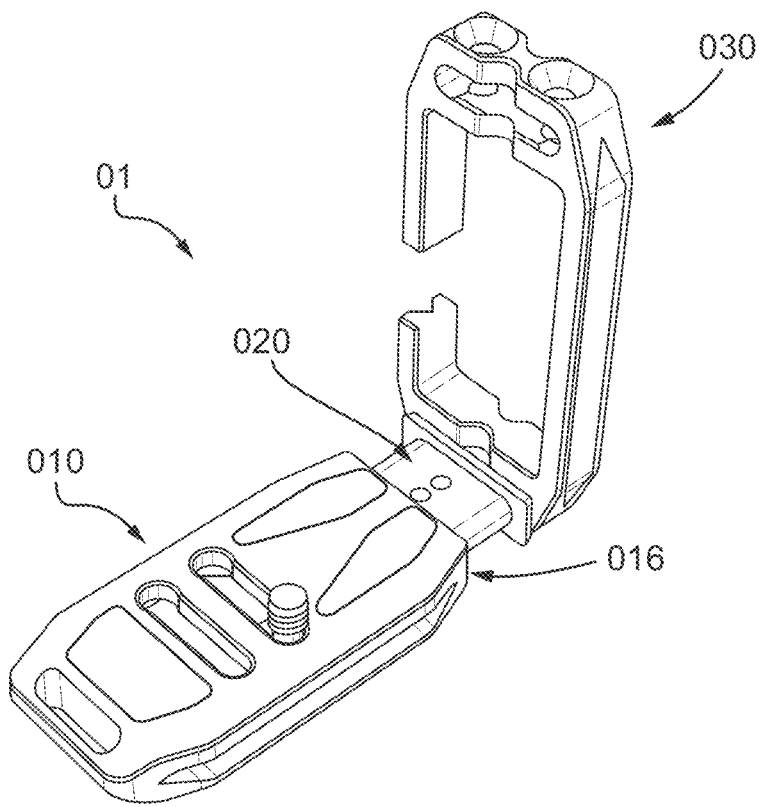
FIG. 7B schematically illustrates an example mounting assembly in a second configuration.
Figure 7C:
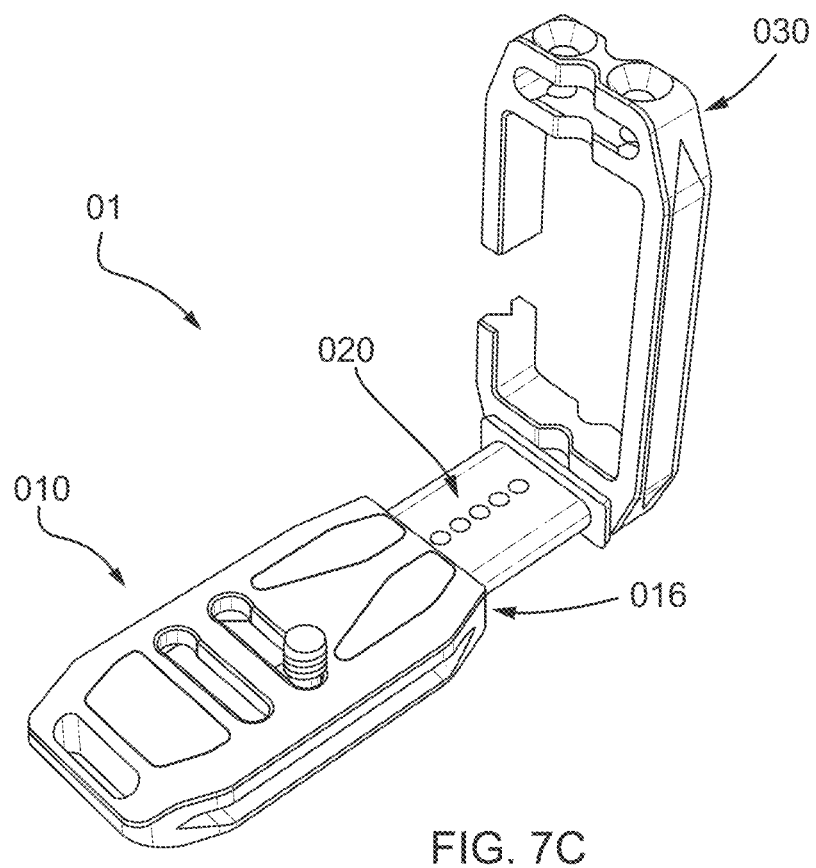
FIG. 7C schematically illustrates an example mounting assembly in a third configuration.

As mentioned, the mounting assembly 01 of FIG. 6 illustrates the side element 030 and the base 010 being connected by an extension plate 020. FIG. 7A through 7C illustrate how an amount of overlap of the extension plate 020 and base 010 is determined by the position in which the extension plate 020 is secured to the base 010. Also demonstrated in these figures is how the positioning of the extension plate 020 determines a distance between the side element 030 and the base 010.

FIG. 7A shows the extension plate 020 secured in a first position relative to the base 010. The extension plate 020 is arranged such that the base 010 and a surface of the side element 030 are touching, in a minimum extension position. In the shown examples, the extension plate 020 has a longitudinal axis and the base 010 has a longitudinal axis, which are aligned with each other, and the extension plate 020 is positioned in a plane parallel to the plane of the base 010. The extension plate 020 can be repositioned along the longitudinal axis of the base 010 and re-secured by a user, as illustrated in FIG. 7B, resulting in an increased length of the base section of the assembly 01 by virtue of the extension plate projecting further from the base. In other words, in this position, there is less overlap between the extension plate and the base, that when the extension plate is positioned as shown in FIG. 7A. Consequently, the distance between the base 010 and the side element 030 has been increased. The extension plate 020 of FIG. 7B can be repositioned again to secure the extension plate 020 in a different position, as demonstrated in FIG. 7C, to further increase the distance between the side element 030 and the base plate 010. Again, this further decreases the overlap between the extension plate and base. Varying the distance between the side element 030 and the base 010 in this way makes the mounting assembly 01 compatible with various photographic devices of different widths or to provide a variable size separation between a side of a photographic device and the side element.

Although only three positions have been demonstrated in FIGS. 7A-7C it should be appreciated that the extension plate 010 can be secured to the base 010 in a plurality of positions, not limited to those demonstrated. Movement of the extension plate 020 between the positions shown in FIGS. 7A-7C, or any number of positions, can be achieved by slidable movement of the extension plate 020 relative to the base 010. The extension plate 020 can be slidably moved along axis parallel to the plane of the base 010.

Figure 8:
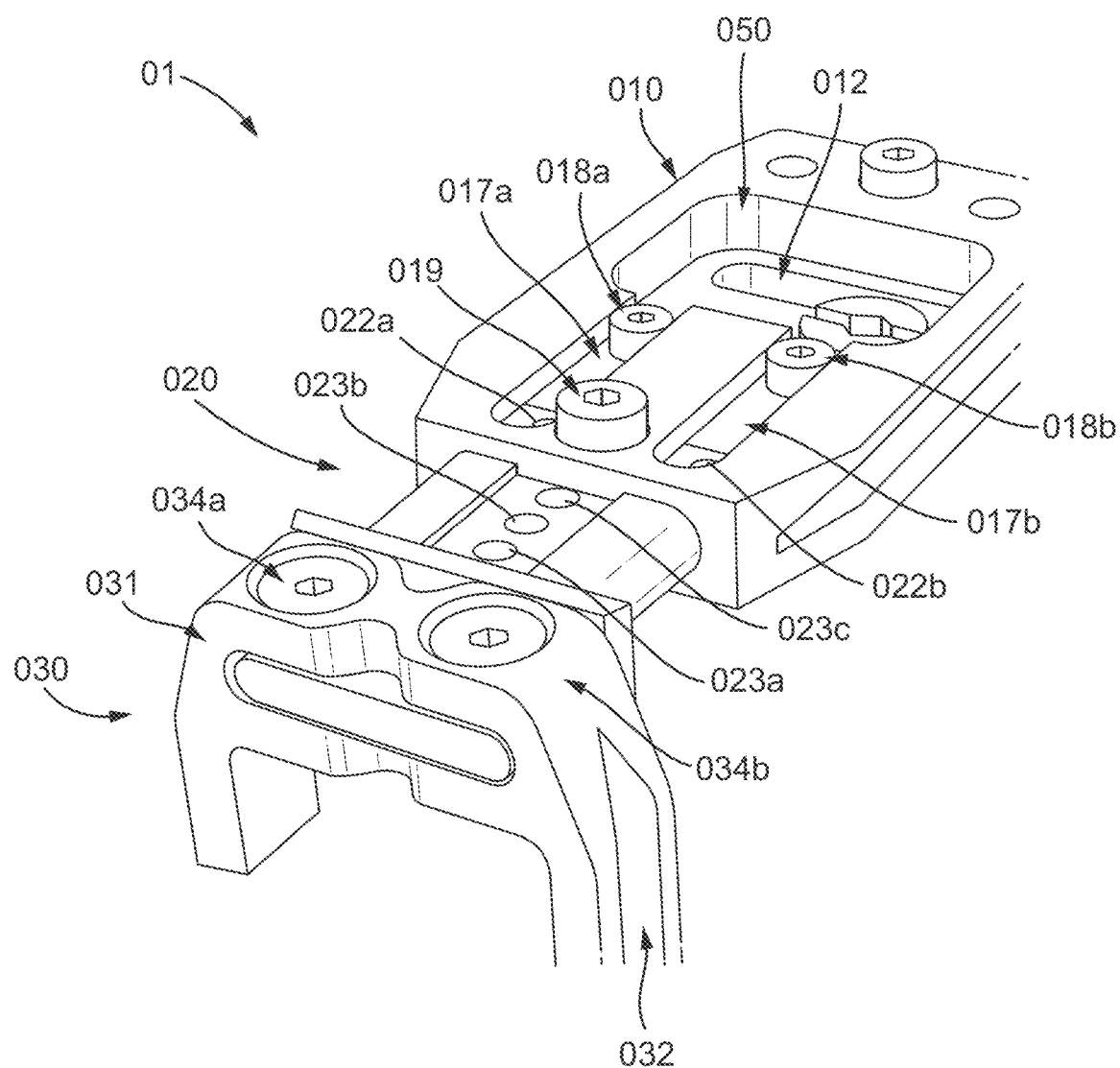
FIG. 8 schematically illustrates an example mounting assembly in an assembled configuration.

In the examples shown in the figures, the base 010 of the mounting assembly 01 comprises a first recess 016 shaped to receive the extension plate 020. In the example figures, the recess is a bore 016 shaped to receive the extension plate 020, and is best illustrated in FIG. 8. The bore helps provide smooth, slidable movement between the base 010 and the extension plate 020 when moving the extension plate 020 between a plurality of positions. In FIG. 8, slidable movement is along an axis parallel to the plane of the base 010, which is the same axis as the longitudinal axis of the base 010. Therefore, the extension plate 020 can be repositioned relative to the base 010 without the need for complete removal of the extension plate 020 from the bore 016.

FIG. 8 also demonstrates how, in some examples, the extension plate 020 comprises one or more guides. In FIG. 8, two guides 022a and 022b are arranged in use to direct sliding of the extension plate 020 relative to the base 010. In this example, the base 010 further comprises two slots 017a and 017b, with one guide of the two guides 022a and 022b being located in each slot 017a and 017b respectively. In this example, each slot 017a, 017b is a channel with a length that is a portion of the length of the base 010, positioned in a direction parallel to the longitudinal axis of the base 010. The slots 017a, 017b are identical in length and arranged parallel to the longitudinal axis of the base 010 but are positioned at different locations between the sides of the base 010. This arrangement of the slots 017a, 017b aids in guiding the sliding movement of the extension plate 020 along an axis parallel to the base 010 by preventing sideways movement relative to this axis.

In FIG. 8 the sliding guides 022a, 022b are screws that have been inserted into the extension plate 020 perpendicularly to the longitudinal axis of the extension plate 020. The screw head protrudes from the plane of the extension plate 020 such that they engage with the sides and ends of the slots 017a, 017b. Engagement of the screws with the sides and ends of the slots 017a, 017b prevents further movement of the extension plate 020.

In other examples where the extension plate 020 comprises any number of guides 022a, 022b, there may be a corresponding number of slots 017a, 017b with one guide 022a, 022b located in each. Alternatively, there may be more guides 022a, 022b than slots 017a, 017b such that more than one of the guides 022a, 022b is located in each slot 017a, 017b.

If more than one guide 022a, 022b is located in one slot 017a, 017b, they may be located at different locations in the slot 017a, 017b, as to limit the range of motion of the extension plate 020. Using guides 022a, 022b in this way to limit the distance that the extension plate 020 can extend can provide greater stability as a larger portion of the extension plate 020 remains within the bore 016, even when in a maximum extension position. Additionally, using guides 022a, 022b to limit the portion of the extension plate 020 that can be located in the bore 016 prevents the side element 030 from contacting the base 010 when in motion, thereby preventing a collision of the side element 030 with the base 010 and causing damage to either of these components. Further, by having multiple guides, the ability of the extension plate to twist relative to the base when sliding is reduced, limiting the chance of the extension plate becoming jammed in the bore 016 providing the first recess.

In various examples, the base 010 further comprise one or more stoppers 018a,018b located one end of at least one of the one or more slots 017a, 017b. The stoppers 018a, 018b may be located at both ends of at least one of the one or more slots 017a, 017b. These stoppers 018a, 018b reduce the collision impact of the guides 022a, 022b with the ends of the slots 017a, 017b when the extension plate 020, and therefore the guides 022a, 022b, are in motion. This reduces damage to the slots 017a, 017b when the assembly 01 is in use and reducing the noise produced during the collision. Stoppers 018a, 018b may additionally or alternatively be present along the walls of at least one of the one or more slots 017a, 017b. In alternative examples, the stoppers 018a, 018b shown in FIG. 8 are the screw heads for the guides 022a, 022b (and which are shown out of place in FIG. 8).

In the example shown in FIG. 8, the extension plate 020 comprises at least one raised surface. The raised surface is, in this example, present along the whole longitudinal length of the extension plate 020. In FIG. 8, two raised surfaces are shown either side of the extension plate 020 parallel with the longitudinal axis and present on both an upper and lower surface of the extension plate 020. The bore 016 on the base 010 has a complimentary shape to fit these raised surfaces. This arrangement further aids in guiding the direction of sliding motion of the extension plate 020 by limiting movement of the extension plate 020 within the recess or bore 016 in directions other than along the longitudinal axis of the extension plate 020. In some examples, one or more raised surfaces is able to act as the only guides with the guides 022a, 022b located in the slots 017a, 017b being optional features.

The base plate 010 shown in FIG. 8 further comprises a locking member 019. The locking member is arranged in use to secure the extension plate 020 when in one of the plurality of positions. In the example shown in FIG. 8, the locking member 019 may be located on the lower surface of the base 010 so as to not interfere with the interaction of the upper surface of the base 010 with the device. In other examples the locking member is located elsewhere, such as on a side or upper surface of the base.

As shown in the example of FIG. 8, the locking member 019 can be a screw whose axis of insertion intersects with the axis of motion of the extension plate 020, which may be along its longitudinal axis. The locking member 019 can be tightened to exert a force on the extension plate 020 so as to engage and hold the extension plate 020 in position. In this way, the extension plate is being held securely in place, such that it will remain in position when the mounting assembly 01 is desired to be in a fixed position. The position of the extension plate 020 relative to the base 010 is able to be altered when the mounting assembly 01 is connected to a device or, alternatively, when it is not connected to a device. This can be achieved by untightening (for example, by loosening or removing) the locking member 019, repositioning the extension plate 020, and (re)tightening the locking member 019 such that the extension plate 020 is held in a different position of the plurality of position.

The extension plate 020 illustrated in FIG. 8 comprises a plurality of apertures 023a, 023b, 023c each arranged such that, when the extension plate 020 is in one of the plurality of positions, one of the plurality of apertures 023a, 023b, 023c can receive the locking member 019. In some examples, such as the example shown in FIG. 8, these apertures 023a, 023b, 023c are arranged along the longitudinal axis of the extension plate 020. In similar examples, the apertures align parallel to the longitudinal axis of the extension plate.

The locking member 019 can be tightened to engage with the inner surface of one of the apertures 023a, 023b, 023c on the extension plate 020 so as hold the extension plate 020 in position. The inclusion of these apertures 023a, 023b, 023c improves connection between the extension plate 020 and the base 010 by tightly encasing the body of locking member 019 in one of the apertures 023a, 023b, 023c, thereby holding the extension plate 020 in place.

The mounting assembly 01 optionally comprises a side element 030. The side element 030 may be any suitable structural component or may comprise a plurality of structural components. In the example mounting assembly 01 shown in the figures, the side element 030 is typically secured to the assembly 01 at a right angle to the base 010 and extension plate 020 such to form an L-bracket.

The side element may be an arm, as shown in FIGS. 6-9 and FIG. 14. In these examples, the arm typically has a front face and a rear face separated by a side. Typically, the arm has an aperture through its centre, like a ring, and is generally rectangular in shape. This allows access through the arm for cables or to allow a user's fingers access through the arm. In some examples, the arm comprises at least one recess 031, and can, in various example include only a single recess. This allows the arm to receive the extension plate 020 in a various positions and/or orientations. This feature is particularly useful when the arm comprises a 'C' shape ring, such that the opening 033 of the 'C' may be in located in different positions relative to the base 010. As shown in the FIGS. 9, this example mounting assembly 01 comprises two recesses 031 located on two opposing ends of the arm. This positioning of the recesses allows the opening 033 to be arranged in four different orientations relative to the base 010: two with the front face closer to the base 010 and two with the rear face closer to the base 010. Typically, the recess 031 is a bore and more specifically a through bore 031. This limits relative movement of the arm with the extension plate 020 more than an arm without a recess 031 by providing a better connection between the two components.

Figure 9:
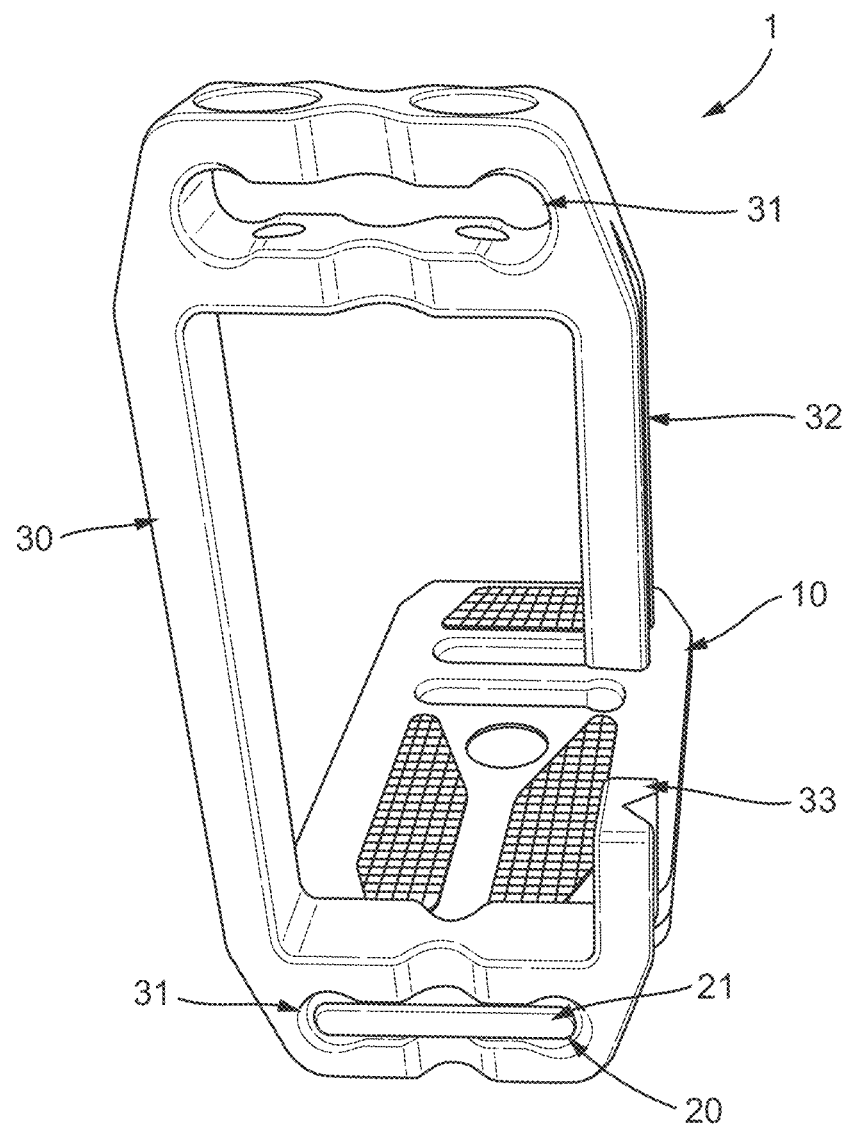
FIG. 9 schematically illustrates an example mounting assembly in an assembled configuration.

To further limit the relative movement of the arm, the extension plate 020 in the mounting assembly 01 shown in FIG. 9 is removably secured to the arm at an end of the plate 021. An attachment means 034a, 034b is arranged to provide engagement of the arm with the extension plate 020. The attachment means 034a, 034b is typically positioned proximal to one of the recesses 031. The arm may comprise more than one attachment means 034a, 034b. In this example, the attachment means 034a, 034b is one or more one screw, specifically, as most easily seen from FIG. 8, two screws 034a, 034b. The attachment means 034a, 034b can be tightened to exert a force on the extension plate 020 so as to engage and hold the extension plate 020 in position relative to the arm. The extension plate 020 can comprise one or more apertures positioned to receive the screws and functioning in a similar means to the apertures arranged to receive the locking member 019.

The attachment means 034a, 034b, as shown in FIG. 8, pass through bores in the arm. The bores each have an opening in an end of the rectangle formed by the arm. In other examples, the bores are located elsewhere, such as in a side of the rectangle formed by the arm. Regardless, the bores are able to be threaded or un-threaded.

As shown most clearly in FIG. 8, in some examples the arm comprises an engagement structure 032 that comprises a pair of grooves positioned on opposing longitudinal sides of the side element. The grooves are symmetric about their longitudinal centre. In other words, the "double-sided dovetail" grooves can cooperate with a jaw of a corresponding member on a support. As with the dovetail grooves of the base 010, in various examples, the engagement structure 032 of the side element conforms to the Arca-Swiss format for dovetail grooves or dovetail rails. This allows the side element to engage with a support in the same manner as the base, hence providing the mounting assembly 01 with the functionality of an L-bracket when constructed.

It should be appreciated that any above-mentioned features described in relation to the arm may be present on any side element 030 included in the mounting assembly 01.

Figure 10:
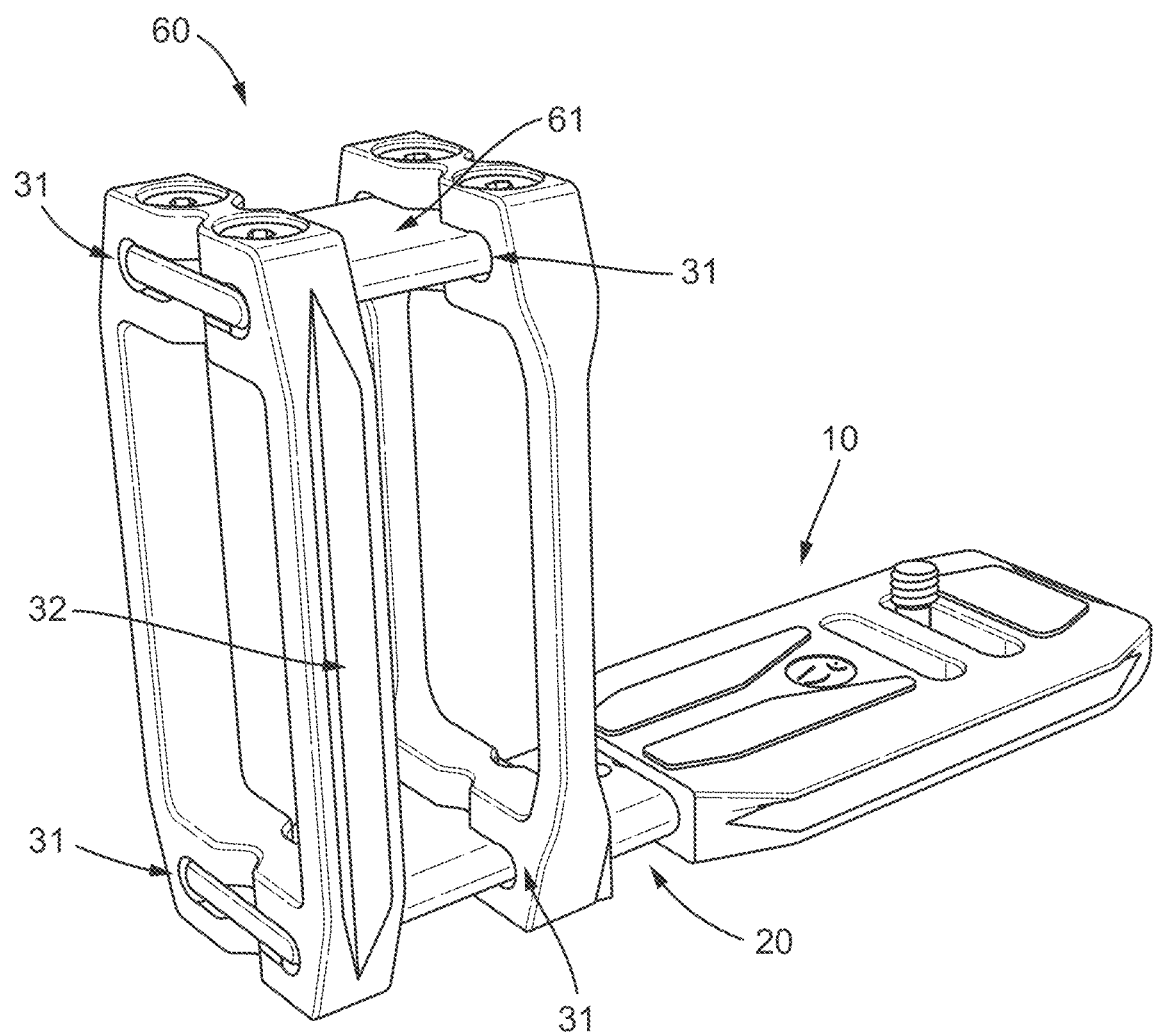
FIG. 10 schematically illustrates a further example mounting assembly in an assembled configuration.

FIG. 10 shows an example mounting assembly 01 with a side element 030 comprising of two arms. The each of the two arms can be generally similar to the arm described above, the first arm in this example being identical to the arm described above, and the second arm comprising all of the described features apart from the engagement means. In other examples, each arm may comprise any combination of the above described features included on the arm. The first arm is located at an end of the extension plate 020 distal to the base 010 (i.e. at the end of the section of the extension plate that slidably extends from the base in use). The second arm is located on the extension plate at an offset position from the point at which the first arm is located separating the first arm from the base. Both arms are independently securable to the extension plate 020 using the respective attachment means 034a, 034b.

The side element 030 may additionally comprise a support plate 061. The support plate 061 typically has dimensions such that it can be received by one of the recesses 031 located each of the two arms, thereby being positionable in a plane substantially parallel to the extension plate 020. As such, the side element 030 forms a cage structure 060, which aids with organising any wires coupled to the device and provides additional support to the camera when the mounting assembly 01 is connect to the support via the engagement structure 032 on the side element 030. The support plate 061 can be secured to each arm using the respective attachment means 034a, 034b, and the two plates 020, 060 may be securable at a plurality of locations along the support plate.

In other examples, both arms may be identical such that a user may use the arms interchangeably thereby allowing the manufacturer to only make one arm type. The support plate 060 may be identical to the extension plate 020 such that the manufacturer only needs to create one model that is both a support plate 060 and an extension plate 020.

Figure 11:
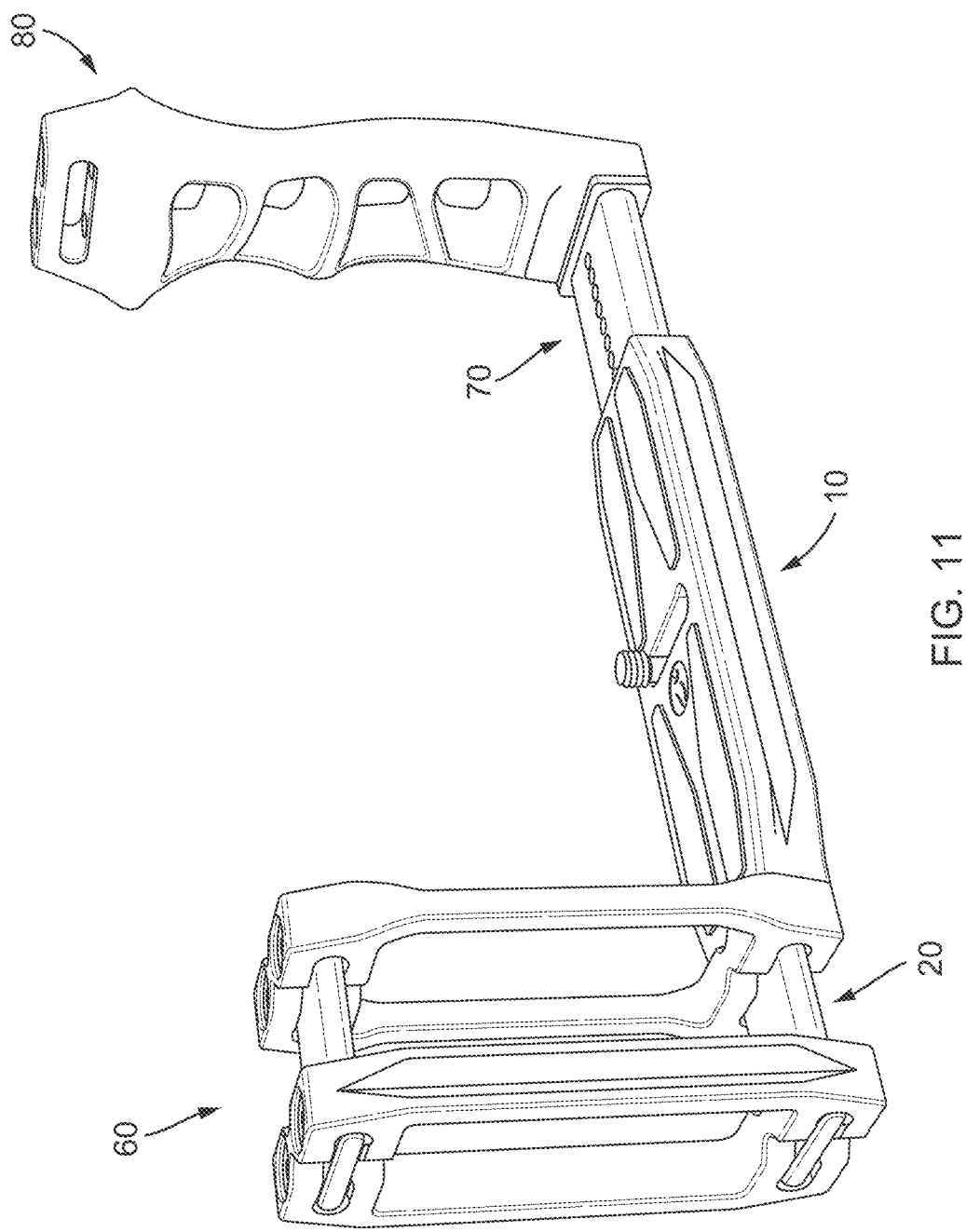
FIG. 11 schematically illustrates another example mounting assembly in an assembled configuration.

In the example mounting assembly 01 shown in FIG. 11, the mounting assembly 01 additionally comprises a second extension plate 070. As shown, the extension plate 020 is securable at a first end of the base 010 and the second extension plate 070 is securable to a second end of the base 010. In this example, the longitudinal axis of the base 010, the longitudinal axis of the extension plate 020 and the longitudinal axis of the second extension plate 070 are aligned such that the extension plates 020, 070 lie parallel to the base 010. The second extension plate 070 may comprise any combination of features described above in relation to the extension plate 020.

The base 010 can comprise another recess shaped to receive the second extension plate 070. This recess may be non-overlapping with the first recess 016 in the base 010. In the example shown in FIG. 11, the side element 030 secured to the second extension plate 070 is a handle 080. Having a handle 080 as the side element 030 can be useful when orientating the mounting assembly 01 and provides an easy means of carrying the assembled mounting assembly 01.

Figure 12:
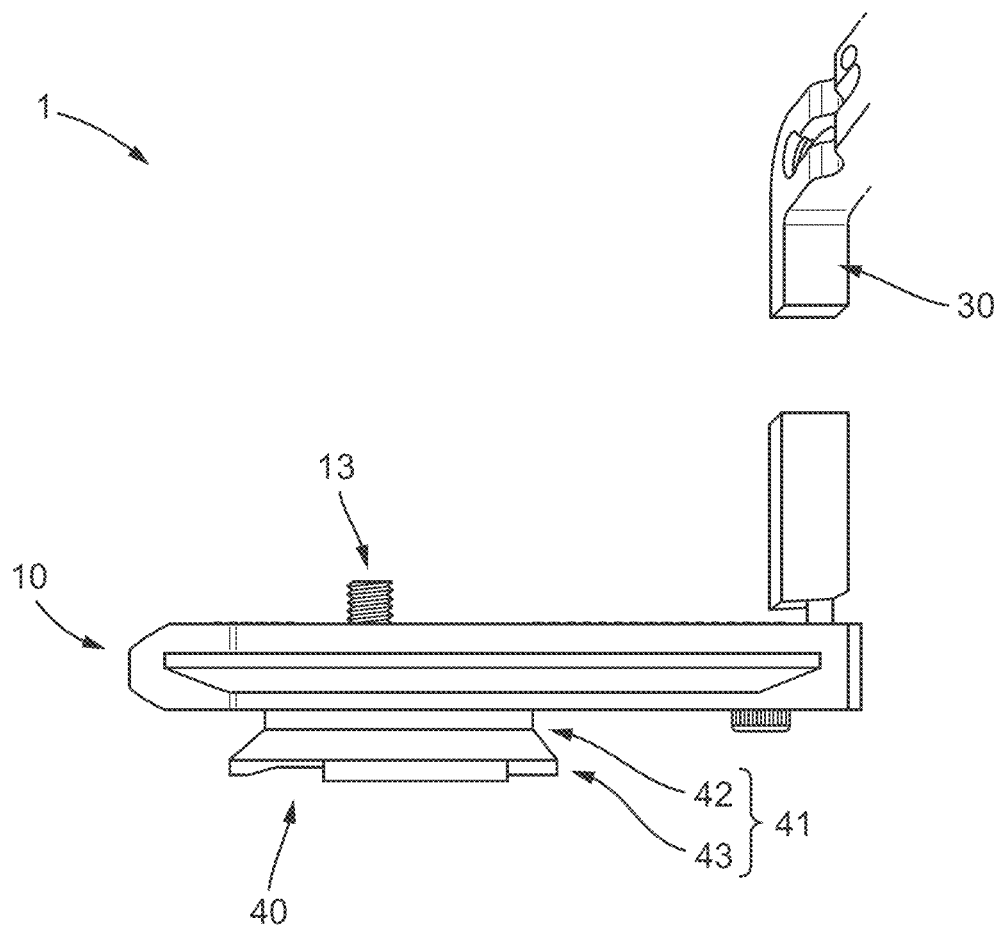
FIG. 12 schematically illustrates an example mounting assembly in an assembled configuration including a docking member.

The example mounting assembly 01 of FIG. 12 includes a docking member 040 removably secured to the base 010 and having a shape arranged to provide engagement with the support. As shown, the docking member 040 is secured to the base by the securing element 013 of the connector 011. In various examples, the docking member 040 comprises a foot 041 with a surface shaped to engage with the support. Typically, the foot 041 comprises an ankle section 042 and tapered section 043. The tapered section 043 projects outwardly and away from the straight ankle section 042. In other examples, the docking member is able to have a ball-joint instead of or in addition to the foot. Such a ball-joint takes the form of a sphere mounted on a pillar with a smaller diameter than the sphere on at least a part of the length of the pillar. This allows engagement with a Spider Holster type support.

As shown in FIG. 8, the base 010, in some examples, comprises a third recess 050 arranged, in use, to receive at least a portion of the docking member 040. This is typically located on the lower surface of the base 010. In the example shown, the third recess 050 is shaped such that a first portion of the ankle section 042 of the docking member 040 is received and a second portion of the ankle section 042 protrudes from the base 010. Alternatively, the whole of the ankle section 042 may be received by the third recess 050 such that only the tapered section 043 protrudes from the base 010. The tapered section 043 typically has a generally square or rectangular shape.

The first recess 016 and third recess 050 are shown in the example of FIG. 8 to be non-overlapping. In other examples, these recesses can overlap or connect with each other.

Figure 13:
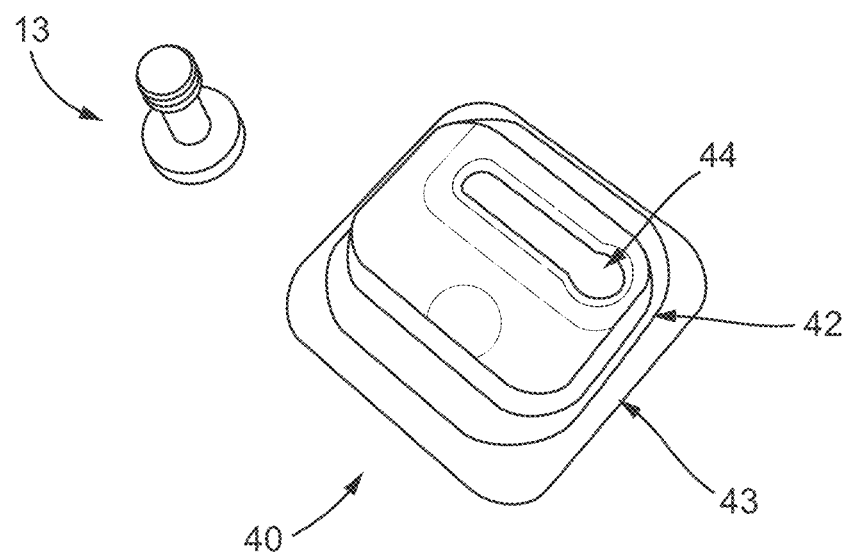
FIG. 13 schematically illustrates the docking member in an unassembled configuration.

As shown in FIG. 13, in some examples, the docking member 040 comprises a bore 044. This can have the same or similar shape and size as the connector bores 012. In this way, the bores 044, 012 can align such that the docking member 040 can be connected through the lower surface of the base 010 by the securing element 013.

Due to the shape of the docking member 040 in this example, it may be connected to the support in various orientations. For example, the docking member 040 may comprise four sides of the same dimensions. Alternatively, the docking member 040 may have two sets of sides of the same dimensions. In some examples, the tapered section 043 may have the specific dimensions of a chosen support, such as a holster.

Docking members 040 of various shapes and sizes may be compatible with one mounting assembly 01. When the assembly 01 comprises a third recess 050, these docking members 040 must all have a shape compatible with the third recess 050, however, the protruding section, or tapered section 043, may be any shape and/or size. To change the docking member 040, the securing element 013 may be untightened and removed from the assembly 01, the docking member 040 may be changed and re-secured.

Figure 14:
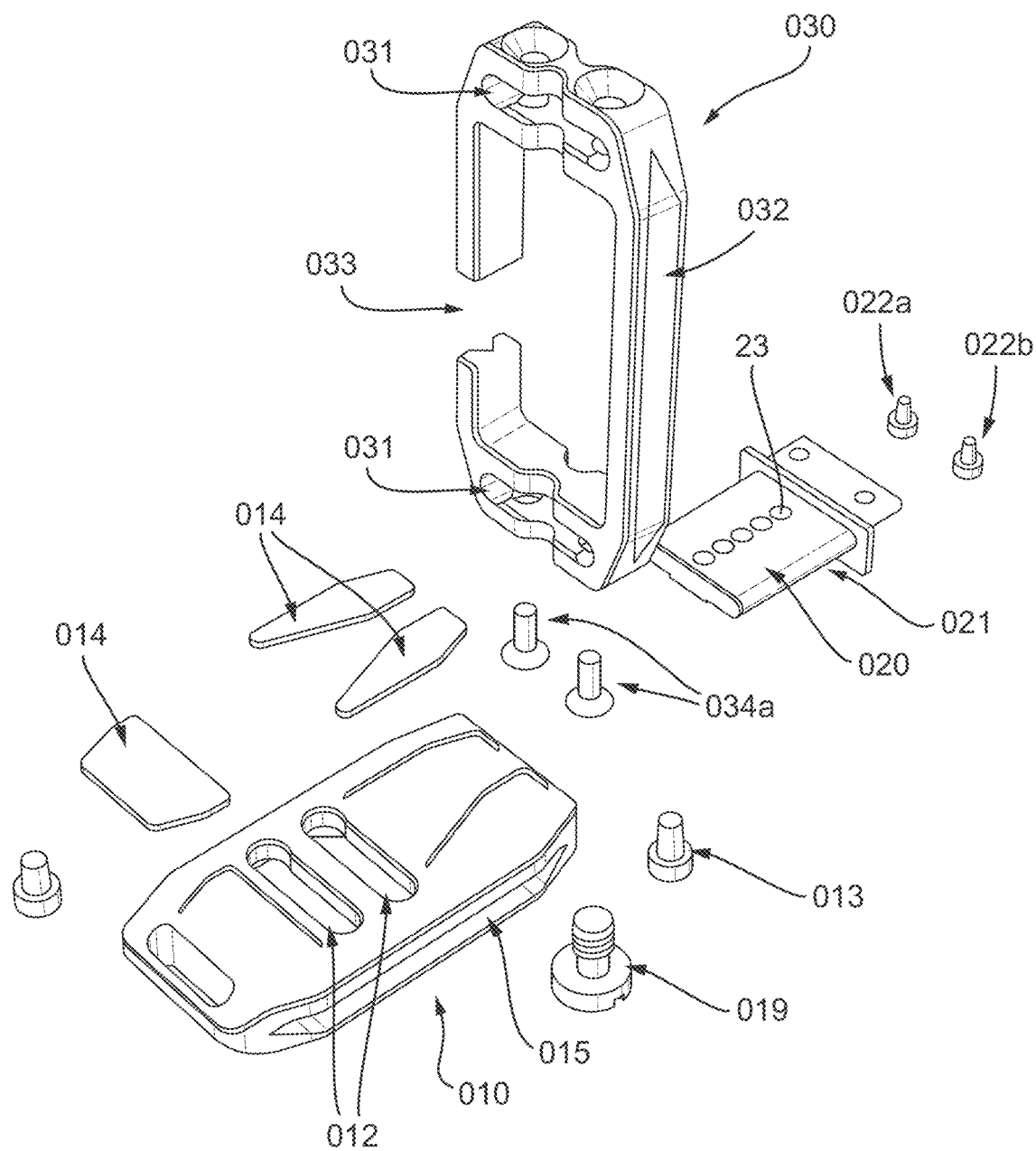
FIG. 14 schematically illustrates an example mounting assembly in an unassembled configuration.

The mounting assembly 01 can be seen in FIG. 14 in an unassembled configuration. It can be seen from FIG. 14 that the mounting assembly 01 can easily be assembled from a kit consisting mainly of the arm 030, the extension plate 020 and the base 010. It can be also seen that the components of the assembly 01 are easily disassembled and reassembled using the locking member 019, the attachment means 034a, 034b and the securing element 013.

In FIG. 14, it can also be seen that, in some examples, the extension plate 020 has a flange or collar. In various examples this flange provides a separation between a portion of the extension plate that allows the plate and base to be secured together, such as by providing a portion that is slidable into a bore in the base, and a portion to which a side element 030 is removably securable. Some examples of the flange have the flange arranged in use to provide a stop limiting an amount any side element is able to slide on to the extension plate and/or an amount the extension plate is able to slide into a recess in the base.

In various examples, the base 010, each extension plate 020 and each side element 030 are made of a magnesium alloy (also referred to as "mag alloy"). When a handle 080 provides one or each side element, this may be made from a different material and/or may include a rubber like material or other material to enhance how easy the handle is to grip by a user. Any docking member 040 may be made of mag alloy or (recycled) plastic.

The base 010 is typically in the range of 10 centimetres (cm) to 25 cm in length, has width of around 5 cm and a thickness/height of about 1 cm. Any arm provided may have comparable dimensions with the length translating to height when the arm is connected to the side element.

The invention claimed is:

1. A mounting assembly for mounting a photographic device to a support, the mounting assembly comprising:
   a base against which the photographic device is placeable in use, the base comprising an engagement structure arranged in use to provide engagement of the base with the support;
   a connector engaged with the base in use and arranged in use to removably connect to the photographic device;
   an extension plate securable to the base in a plurality of positions and removably securable to a side element, an amount of overlap of the extension plate and base being determined by the position in which the extension plate is secured to the base, the position of the side element relative to the base thereby being movable
   wherein the base further comprises one or more locking members arranged to secure the extension plate when in any one of the plurality of positions; and
   wherein the extension plate further comprises a plurality of apertures each arranged such that, when the extension plate is in one of the plurality of positions, one or more of the plurality of apertures is able to receive one of the one or more locking members.

2. A mounting assembly according to claim 1, wherein the extension plate has a longitudinal axis and the base has a longitudinal axis which are aligned with each other, and the extension plate is positioned in a plane parallel to the plane of the base.

3. A mounting assembly according to claim 1, further comprising a second extension plate.

4. A mounting assembly according to claim 3, wherein the extension plate is securable at a first end of the base and the second extension plate is securable at a second end of the base.

5. A mounting assembly according to claim 1, further comprising a plurality of extension plates.

6. A mounting assembly according to claim 1, wherein the extension plate is slidable relative to the base.

7. A mounting assembly according to claim 6, wherein the extension plate is slidable along an axis parallel to the plane of the base.

8. A mounting assembly according to claim 6, wherein the extension plate further comprises one or more guides arranged in use to direct sliding of the extension plate relative to the base.

9. A mounting assembly according to claim 8, wherein the base further comprises one or more slots, and at least one of the one or more guides is located in each of the one or more slots.

10. A mounting assembly according to claim 9, wherein the sliding guide is a screw.

11. A mounting assembly according to claim 1, wherein the locking member is a screw.

12. A mounting assembly according to claim 1, further comprising the side element.

13. A mounting assembly according to claim 12, wherein the side element comprises a second recess shaped to receive the plate.

14. A mounting assembly according to claim 13, wherein the second recess is a bore.

15. A mounting assembly according to claim 1, wherein the extension plate is removably securable to the side element at an end of the plate.

16. A mounting assembly according to claim 12, wherein the side element comprises an attachment means arranged to provide engagement of the side element with the extension plate.

17. A mounting assembly according to claim 16, wherein the attachment means is one or more screws.

18. A mounting assembly according to claim 1, wherein the side element is an arm, the mounting assembly thereby providing an L-bracket when the side element is secured to the extension plate.

19. A mounting assembly according to claim 1, further comprising a docking member removably securable to the base and having a shape arranged to provide engagement with the support.

20. A mounting assembly according to claim 19, wherein the docking member is secured to the base by the connector.

21. A mounting assembly according to claim 19, wherein the shape of the docking member comprises a foot with a surface shaped to engage with the support.

22. A mounting assembly according to claim 19, wherein the base further comprises a third recess arranged in use to receive at least a portion of the docking member.

23. A mounting assembly according to claim 19, wherein the base further comprises a third recess arranged in use to receive at least a portion of the docking member, and wherein the third recess and the first recess are non-overlapping.

24. A kit of parts for a mounting assembly suitable for mounting a photographic device to a support, the kit comprising:
  a base against which the photographic device is placeable in use, the base comprising an engagement structure arranged in use to provide engagement of the base with the support;
  a connector engagable with the base in use and arranged in use to removably connect to the photographic device;
  an extension plate securable to the base in a plurality of positions and removably securable to a side element, an amount of overlap of the extension plate and base being determined by the position in which the extension plate is secured to the base, the position of the side element relative to the base thereby being movable
  wherein the base further comprises one or more locking members arranged to secure the extension plate when in any one of the plurality of positions; and
  wherein the extension plate further comprises a plurality of apertures each arranged such that, when the extension plate is in one of the plurality of positions, one or more of the plurality of apertures is able to receive one of the one or more locking members.

25. A mounting assembly according to claim 1, wherein the base comprises a first recess shaped to receive the extension plate.

26. A mounting assembly according to claim 25, wherein the first recess is a bore.

* * * * *

UNITED STATES PATENT AND TRADEMARK OFFICE
CERTIFICATE OF CORRECTION

| | | |
|---|---|---|
| PATENT NO. | : 12,104,741 B2 | Page 1 of 1 |
| APPLICATION NO. | : 17/854353 | |
| DATED | : October 1, 2024 | |
| INVENTOR(S) | : Danny Lenihan | |

It is certified that error appears in the above-identified patent and that said Letters Patent is hereby corrected as shown below:

On the Title Page

(73) Assignee should read as follows:
(73) Assignee: 3 Legged Thing Limited, Bedfordshire (GB)

Signed and Sealed this
Twelfth Day of November, 2024

*Katherine Kelly Vidal*

Katherine Kelly Vidal
*Director of the United States Patent and Trademark Office*